United States Patent
Wehnes et al.

(10) Patent No.: US 9,256,941 B2
(45) Date of Patent: *Feb. 9, 2016

(54) MICROCALCIFICATION DETECTION AND CLASSIFICATION IN RADIOGRAPHIC IMAGES

(71) Applicant: VuCOMP, Inc., Plano, TX (US)

(72) Inventors: Jeffrey C. Wehnes, Richardson, TX (US); James P. Monaco, Frisco, TX (US); David S. Harding, Austin, TX (US); James H. Pike, Carrollton, TX (US); Anbinh T. Ho, Dallas, TX (US); Lawrence M. Hanafy, New Orleans, LA (US)

(73) Assignee: VUCOMP, INC., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/507,575

(22) Filed: Oct. 6, 2014

(65) Prior Publication Data

US 2015/0023580 A1    Jan. 22, 2015

Related U.S. Application Data

(63) Continuation of application No. 13/695,347, filed on Oct. 30, 2012, now Pat. No. 8,855,388.

(60) Provisional application No. 61/343,609, filed on May 2, 2010, provisional application No. 61/343,608, filed (Continued)

(51) Int. Cl.
*G06T 7/00* (2006.01)
*G06K 9/62* (2006.01)
(Continued)

(52) U.S. Cl.
CPC ............ *G06T 7/0012* (2013.01); *G06K 9/6267* (2013.01); *G06T 5/002* (2013.01);
(Continued)

(58) Field of Classification Search
CPC ... G06T 7/0012; G06T 9/6267; G06T 7/0087; G06T 7/0081
USPC .......................................... 382/128, 190, 205
See application file for complete search history.

(56) References Cited

U.S. PATENT DOCUMENTS

| 4,907,156 A | 3/1990 | Doi et al. |
| 5,109,430 A | 4/1992 | Nishihara et al. |

(Continued)

FOREIGN PATENT DOCUMENTS

| JP | H06149866 A | 5/1994 |
| JP | 2002538704 A | 11/2002 |

(Continued)

OTHER PUBLICATIONS

Netsch T., Peitgen H., "Scale-space signatures for the detection of clustered microcalculations in digital mammograms", IEEE Trans Med Imaging. Sep. 1999;18(9):774-86.*

(Continued)

*Primary Examiner* — Uptal Shah
(74) *Attorney, Agent, or Firm* — Slater & Matsil, LLP

(57) ABSTRACT

An analysis of a digitized image is provided. The digitized image is repeatedly convolved to form first convolved images, which first convolved images are convolved a second time to form second convolved images. Each first convolved image and the respective second convolved image representing a stage, and each stage represents a different scale or size of anomaly. As an example, the first convolution may utilize a Gaussian convolver, and the second convolution may utilize a Laplacian convolver, but other convolvers may be used. The second convolved image from a current stage and the first convolved image from a previous stage are used with a neighborhood median determined from the second convolved image from the current stage by a peak detector to detect peaks, or possible anomalies for that particular scale.

20 Claims, 18 Drawing Sheets

Related U.S. Application Data on May 2, 2010, provisional application No. 61/343,552, filed on May 2, 2010, provisional application No. 61/343,557, filed on Apr. 30, 2010, provisional application No. 61/395,029, filed on May 6, 2010, provisional application No. 61/398,571, filed on Jun. 25, 2010, provisional application No. 61/399,094, filed on Jul. 6, 2010, provisional application No. 61/400,573, filed on Jul. 28, 2010.

(51) Int. Cl.
*G06T 5/00* (2006.01)
*G06T 5/10* (2006.01)

(52) U.S. Cl.
CPC ............... *G06T 5/10* (2013.01); *G06T 7/0081* (2013.01); *G06T 7/0087* (2013.01); *G06T 2207/10116* (2013.01); *G06T 2207/20016* (2013.01); *G06T 2207/30068* (2013.01); *G06T 2207/30096* (2013.01)

(56) References Cited

U.S. PATENT DOCUMENTS

| | | | |
|---|---|---|---|
| 5,133,020 | A | 7/1992 | Giger et al. |
| 5,301,129 | A | 4/1994 | McKaughan et al. |
| 5,359,513 | A | 10/1994 | Kano et al. |
| 5,627,907 | A | 5/1997 | Gur et al. |
| 5,638,458 | A | 6/1997 | Giger et al. |
| 5,729,620 | A | 3/1998 | Wang |
| 5,790,690 | A | 8/1998 | Doi et al. |
| 5,828,774 | A | 10/1998 | Wang |
| 5,917,929 | A | 6/1999 | Marshall et al. |
| 5,974,169 | A | 10/1999 | Bachelder |
| 5,982,915 | A | 11/1999 | Doi et al. |
| 5,987,094 | A | 11/1999 | Clarke et al. |
| 5,999,639 | A | 12/1999 | Rogers et al. |
| 6,011,862 | A | 1/2000 | Doi et al. |
| 6,014,452 | A | 1/2000 | Zhang et al. |
| 6,075,879 | A | 6/2000 | Roehrig et al. |
| 6,088,473 | A | 7/2000 | Xu et al. |
| 6,125,194 | A | 9/2000 | Yeh et al. |
| 6,138,045 | A | 10/2000 | Kupinski et al. |
| 6,141,437 | A | 10/2000 | Xu et al. |
| 6,198,838 | B1 | 3/2001 | Roehrig et al. |
| 6,233,364 | B1 | 5/2001 | Krainiouk et al. |
| 6,240,201 | B1 | 5/2001 | Xu et al. |
| 6,246,782 | B1 | 6/2001 | Shapiro et al. |
| 6,282,307 | B1 | 8/2001 | Armato, III et al. |
| 6,335,980 | B1 | 1/2002 | Armato, III et al. |
| 6,404,908 | B1 * | 6/2002 | Schneider et al. ............. 382/132 |
| 6,483,934 | B2 | 11/2002 | Armato, III et al. |
| 6,549,646 | B1 | 4/2003 | Yeh et al. |
| 6,577,752 | B2 | 6/2003 | Armato, III et al. |
| 6,609,021 | B1 | 8/2003 | Fan et al. |
| 6,654,728 | B1 | 11/2003 | Li et al. |
| 6,683,973 | B2 | 1/2004 | Li et al. |
| 6,690,816 | B2 | 2/2004 | Aylward et al. |
| 6,694,046 | B2 | 2/2004 | Doi et al. |
| 6,724,925 | B2 | 4/2004 | Armato, III et al. |
| 6,738,499 | B1 | 5/2004 | Doi et al. |
| 6,757,415 | B1 | 6/2004 | Rogers et al. |
| 6,760,468 | B1 | 7/2004 | Yeh et al. |
| 6,766,043 | B2 | 7/2004 | Zeng et al. |
| 6,795,521 | B2 | 9/2004 | Hsu et al. |
| 6,801,645 | B1 | 10/2004 | Collins et al. |
| 6,813,375 | B2 | 11/2004 | Armato III et al. |
| 6,891,964 | B2 | 5/2005 | Doi et al. |
| 6,909,797 | B2 | 6/2005 | Romsdahl et al. |
| 6,937,776 | B2 | 8/2005 | Li et al. |
| 7,035,465 | B2 | 4/2006 | Comaniciu et al. |
| 7,043,066 | B1 | 5/2006 | Doi et al. |
| 7,054,473 | B1 | 5/2006 | Roehrig et al. |
| 7,088,850 | B2 | 8/2006 | Wei et al. |
| 7,203,349 | B2 | 4/2007 | Zhang et al. |
| 7,274,810 | B2 | 9/2007 | Reeves et al. |
| 7,298,883 | B2 | 11/2007 | Giger et al. |
| 7,336,809 | B2 | 2/2008 | Zeng et al. |
| 7,346,202 | B1 | 3/2008 | Schneider |
| 7,359,538 | B2 | 4/2008 | Zeng et al. |
| 7,397,938 | B2 | 7/2008 | Cathier |
| 7,403,646 | B2 | 7/2008 | Sato |
| 7,418,131 | B2 | 8/2008 | Wang et al. |
| 7,430,308 | B1 | 9/2008 | Kallergi |
| 7,480,401 | B2 | 1/2009 | Shen et al. |
| 7,492,968 | B2 | 2/2009 | Jerebko et al. |
| 7,593,561 | B2 | 9/2009 | Zhang et al. |
| 7,616,818 | B2 | 11/2009 | Dewaele |
| 7,646,902 | B2 | 1/2010 | Chan et al. |
| 7,773,794 | B2 | 8/2010 | Russakoff |
| 8,164,039 | B2 | 4/2012 | Bovik et al. |
| 8,165,385 | B2 | 4/2012 | Reeves et al. |
| 8,260,014 | B2 | 9/2012 | Chen et al. |
| 8,315,446 | B2 | 11/2012 | Raundahl et al. |
| 8,488,863 | B2 | 7/2013 | Boucheron |
| 8,503,742 | B2 * | 8/2013 | Dewaele et al. ............... 382/128 |
| 2001/0008562 | A1 | 7/2001 | Rogers et al. |
| 2002/0016539 | A1 | 2/2002 | Michaelis et al. |
| 2002/0041702 | A1 | 4/2002 | Takeo et al. |
| 2003/0007598 | A1 | 1/2003 | Wang et al. |
| 2003/0194115 | A1 | 10/2003 | Kaufhold et al. |
| 2004/0052328 | A1 | 3/2004 | Sabol et al. |
| 2004/0073107 | A1 | 4/2004 | Sioshansi et al. |
| 2004/0161141 | A1 * | 8/2004 | Dewaele ....................... 382/132 |
| 2005/0008211 | A1 | 1/2005 | Xu et al. |
| 2005/0010106 | A1 | 1/2005 | Lang et al. |
| 2005/0212810 | A1 | 9/2005 | Drory et al. |
| 2006/0083418 | A1 | 4/2006 | Watson et al. |
| 2006/0171573 | A1 | 8/2006 | Rogers |
| 2006/0177125 | A1 | 8/2006 | Chan et al. |
| 2006/0197763 | A1 | 9/2006 | Harrison et al. |
| 2006/0239541 | A1 | 10/2006 | Florin et al. |
| 2006/0285751 | A1 | 12/2006 | Wu et al. |
| 2007/0005356 | A1 | 1/2007 | Perronnin |
| 2007/0019852 | A1 | 1/2007 | Schildkraut et al. |
| 2007/0092864 | A1 | 4/2007 | Reinhardt et al. |
| 2007/0237401 | A1 | 10/2007 | Coath et al. |
| 2007/0258648 | A1 | 11/2007 | Perronnin |
| 2008/0002873 | A1 | 1/2008 | Reeves et al. |
| 2008/0037852 | A1 | 2/2008 | Zhou et al. |
| 2008/0037853 | A1 | 2/2008 | Bernard et al. |
| 2008/0069425 | A1 | 3/2008 | Liu et al. |
| 2008/0069456 | A1 | 3/2008 | Perronnin |
| 2008/0292194 | A1 * | 11/2008 | Schmidt et al. ............... 382/217 |
| 2008/0298666 | A1 | 12/2008 | Mysore Siddu et al. |
| 2008/0317322 | A1 | 12/2008 | Acharyya et al. |
| 2009/0034810 | A1 | 2/2009 | Oakley |
| 2009/0052756 | A1 | 2/2009 | Saddi et al. |
| 2009/0052763 | A1 | 2/2009 | Acharyya et al. |
| 2009/0060297 | A1 | 3/2009 | Penn et al. |
| 2009/0074302 | A1 | 3/2009 | Kishi |
| 2009/0097730 | A1 | 4/2009 | Kasai et al. |
| 2009/0116716 | A1 | 5/2009 | Zhou |
| 2009/0129657 | A1 | 5/2009 | Huo et al. |
| 2009/0169113 | A1 | 7/2009 | Geiger |
| 2009/0171236 | A1 | 7/2009 | Davies |
| 2009/0180674 | A1 | 7/2009 | Chen et al. |
| 2009/0214099 | A1 | 8/2009 | Merlet |
| 2009/0273608 | A1 | 11/2009 | Buchanan |
| 2010/0002929 | A1 | 1/2010 | Sammak et al. |
| 2010/0008424 | A1 | 1/2010 | Pace |
| 2010/0046814 | A1 | 2/2010 | Dewaele et al. |
| 2010/0054563 | A1 | 3/2010 | Mendonca et al. |
| 2010/0098343 | A1 | 4/2010 | Perronnin et al. |
| 2010/0104148 | A1 | 4/2010 | Bovik et al. |
| 2010/0124364 | A1 | 5/2010 | Huo et al. |
| 2010/0208998 | A1 | 8/2010 | Van Droogenbroeck et al. |
| 2011/0026791 | A1 | 2/2011 | Collins et al. |
| 2011/0274327 | A1 | 11/2011 | Wehnes et al. |
| 2011/0280465 | A1 | 11/2011 | Wehnes et al. |
| 2012/0294502 | A1 | 11/2012 | Chan et al. |
| 2013/0272595 | A1 | 10/2013 | Heine et al. |

(56) References Cited

U.S. PATENT DOCUMENTS

FOREIGN PATENT DOCUMENTS

| | | | |
|---|---|---|---|
| JP | 2004105729 A | 4/2004 |
| JP | 2004274431 A | 9/2004 |
| JP | 2008046864 | 2/2008 |
| JP | 2009034517 A | 2/2009 |
| JP | 2010532898 A | 10/2010 |
| WO | 0052641 | 9/2000 |
| WO | 2011137407 A1 | 11/2011 |
| WO | 2011137409 A1 | 11/2011 |
| WO | 2011137410 A1 | 11/2011 |
| WO | 2011137411 A1 | 11/2011 |
| WO | 2012006318 A1 | 1/2012 |

OTHER PUBLICATIONS

Adamczak, et al., "New developments in the Feature Space Mapping model," 3rd Conference Neural Networks, 1997 [no date], 8 pages.
Elgammal, et al., "Probabilistic Tracking in Joint Feature-Spatial Spaces," Computer Vision and Pattern Recognition, IEEE Computer Society Conference, vol. 1, Date of Conference Jun. 18-20, 2003, 8 pages.
Hamamoto, "Classifier in statistical pattern recognition—for enhancement of recognition performance," Image Labo, Japan, Japan Industrial Publishing Co., Ltd., vol. 18, No. 11, Nov. 1, 2007, 8 pages.
International Search Report and Written Opinion received in Application No. PCT/US14/64876 mailed Feb. 4, 2015, 8 pages.
Japanese Office Action received in Application No. 2013-508076 mailed Jan. 13, 2015, 7 pages.
Mittal, et al., "Motion-Based Background Subtraction using Adaptive Kernel Density Estimation," Computer Vision and Pattern Recognition, CVPR 2004, Proceedings of the 2004 IEEE computer Society Conference 2004 [no date], vol. 2, 8 pages.
Shamir, "Feature-Space Analysis of Unstructured Meshes," IEEE Visualization, Date of Conference Oct. 24, 2003, 8 pages.
Tanaka, et al., "Use of Fast Algorithm for Adaptive Background Modeling with Parzen Density Estimation to Detect Objects," The Journal of the Institute of Image Information and Television Engineers, Japan, The institute of Image Information and Tele4vision Engineers, Jan. 27, 2013, 9 pages.
Chinese Office Action received in Application No. 201180028021.9 mailed May 6, 2015, 18 pages.
"CheckMate™ Ultra with PeerView™ Feature," Product Brochure, R2 Technology, Inc., circa 2002.
"ImageChecker™ CT: Workstation DICOM Conformance Statement," PN 390-00-449 Rev. D, R2 Technology, Inc., Sep. 2003.
"ImageChecker™ CT: Server DICOM Conformance Statement," PN 390-00-448 Rev. C, R2 Technology, Inc., Sep. 2003.
"Improving Sensitivity and Efficiency in Lung CT Nodule Detection," ImageChecker® CT LN-1000, Product Brochure, R2 Technology, Inc., circa 2003.
"Improving Sensitivity and Efficiency in Lung CT Nodule Detection," ImageChecker® CT, Product Brochure, R2 Technology, Inc., circa 2003.
"Integrated Tools for Streamlined Review of MDCT Lung Exams," ImageChecker® CT LN-500, Product Brochure, R2 Technology, Inc., circa 2003.
"OmniCad," Product Brochure, R2 Technology, Inc., Oct. 16, 2003.
"R2 Algorithm: The Intuitive Choice," Product Brochure, R2 Technology, Inc., 2003.
"Technical Specifications Sheet for the ImageChecker® Display Units," R2 Technology, Inc., 2004.
"Technical Specifications Sheet for the ImageChecker® Processing Units," R2 Technology, Inc., 2004.
"The ImageChecker® Technology," Patient Pamphlet, R2 Technology, Inc., circa 2002.
"The Total CAD Solution for Film and Digital Mammography," ImageChecker® DM, Product Brochure, R2 Technology, Inc., 2003.
Ball et al., "Digital Mammogram Spiculated Mass Detection and Spicule Segmentation Using Level Sets," Proceedings of the 29th Annual International Conference of the IEEE EMBS, Aug. 23-26, 2007, 6 pages.
"CheckMate™ Ultra with PeerView," Webpage, http://www.r2tech.com/prd/prd005.html, R2 Technology, Inc., 2004, downloaded Jan. 16, 2004.
Netsch, T., et al., "Scale-Space Signatures for the Detection of Clustered Microcalculations in Digital Mammograms," IEEE Trans Med Imaging, Sep. 1999: 18(9): pp. 774-786.
PCT International Preliminary Report on Patentability for International Application No. PCT/US2011/034700, mailed Nov. 6, 2012, 6 pages.
PCT International Written Opinion for International Application No. PCT/US2011/034696, mailed Jul. 15, 2011, 6 pages.
PCT International Search Report for International Application No. PCT/US2011/034696, mailed Jul. 15, 2011, 2 pages.
R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.
R2 Technology, Inc. Products Overview Webpage, http://www.r2tech.com/prd/index.html, downloaded Jan. 16, 2004, 1 page.
R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.
R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.
Van Wijk, C. et al., "Detection and Segmentation of Colonic Polyps on Implicit Isosurfaces by Second Principal Curvature Flow," IEEE Transactions on Medical Imaging, vol. 29, No. 3, Mar. 2010, pp. 688-698.
Japanese Office Action received in Application No. 2013-508073 mailed Apr. 7, 2015, 10 pages.

* cited by examiner

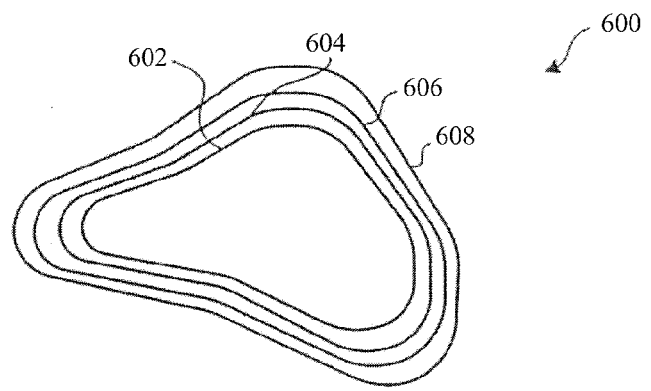
Fig. 6
Fig. 7
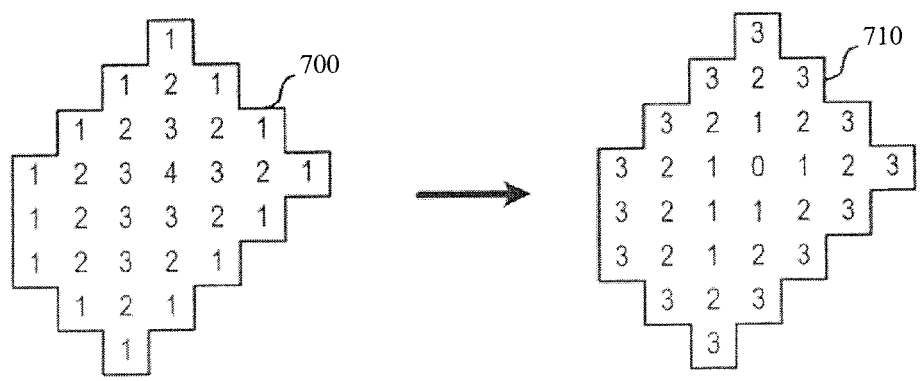

Fig. 16
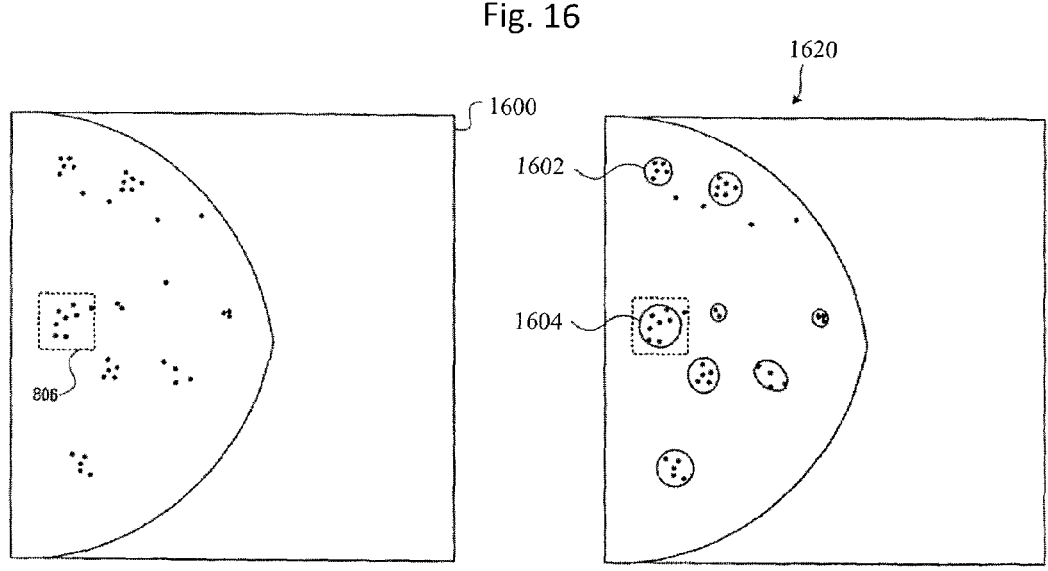
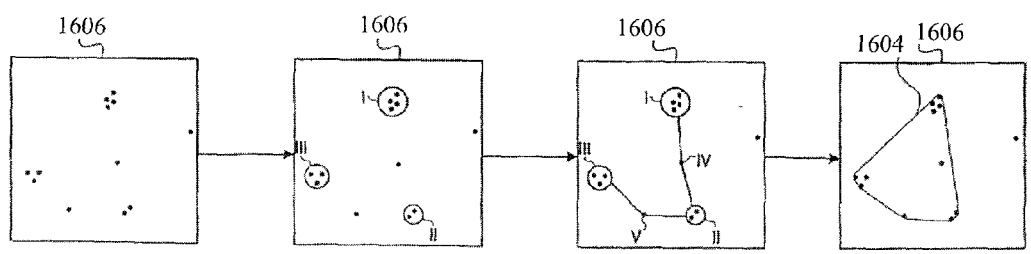

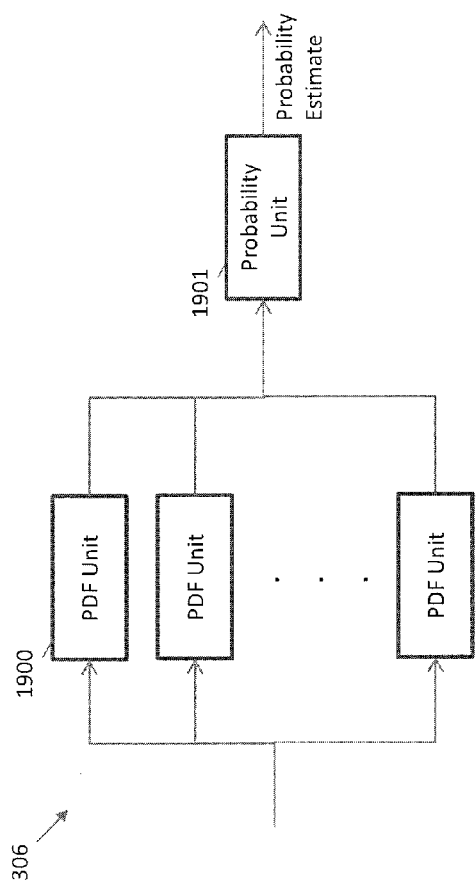
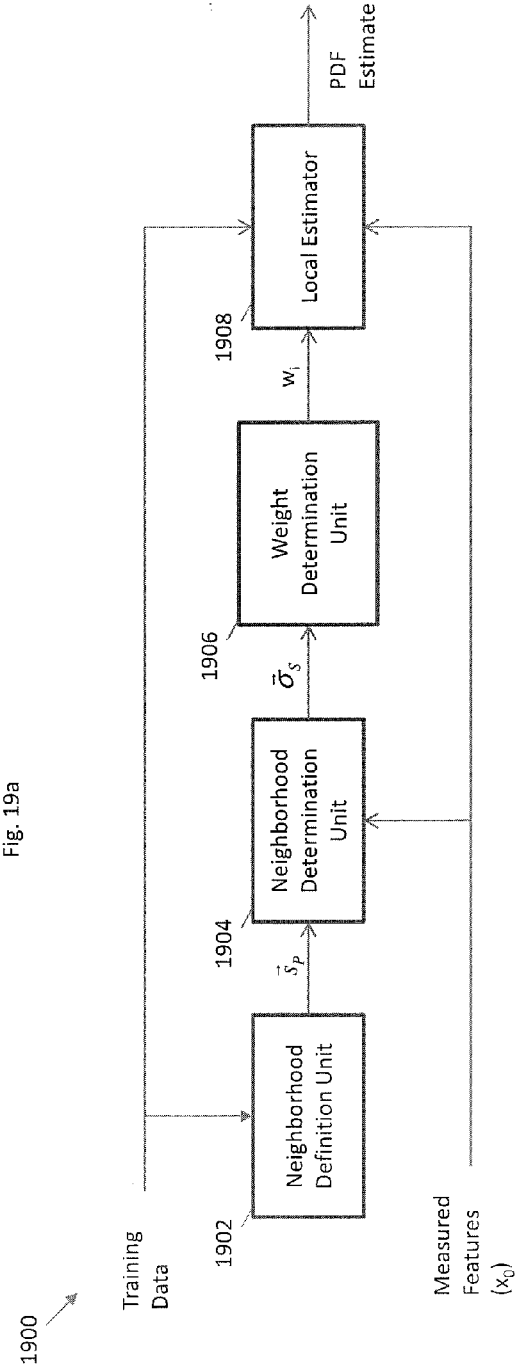
Fig. 19a
Fig. 19b

MICROCALCIFICATION DETECTION AND CLASSIFICATION IN RADIOGRAPHIC IMAGES

This application is a continuation of patent application Ser. No. 13/695,347 filed Oct. 30, 2012, entitled "Microcalcification Detection Classification in Radiographic Images" which claims the benefit of U.S. Provisional Application Ser. No. 61/343,609, filed on May 2, 2010, U.S. Provisional Application Ser. No. 61/343,608, filed on May 2, 2010, U.S. Provisional Application Ser. No. 61/343,552, filed on May 2, 2010, U.S. Provisional Application Ser. No. 61/343,557, filed on Apr. 30, 2010, U.S. Provisional Application Ser. No. 61/395,029, filed on May 6, 2010, U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, all of which applications are hereby incorporated herein by reference.

TECHNICAL FIELD

The present disclosure relates generally to computer-aided detection and classification of microcalcification-like signatures in radiographic images, and more particularly to a classification system and method for microcalcification candidates.

BACKGROUND

Radiologists use radiographic images such as mammograms to detect and pinpoint suspicious lesions in a patient as early as possible, e.g., before a disease is readily detectable by other, intrusive methods. As such, there is real benefit to the radiologist being able to locate, based on imagery, extremely small cancerous lesions and precursors. Microcalcifications, particularly those occurring in certain types of clusters, are one signature of concern. Although the individual calcifications tend to readily absorb radiation and can thus appear quite bright in a radiographic image, various factors including extremely small size, occlusion by other natural structure, appearance in a structurally "busy" portion of the image, all sometimes coupled with radiologist fatigue, may make some calcifications hard to detect upon visual inspection.

Computer-Aided Detection (CAD) algorithms have been developed to assist radiologists in locating potential lesions in a radiographic image. CAD algorithms operate within a computer on a digital representation of the mammogram set for a patient. The digital representation can be the original or processed sensor data, when the mammograms are captured by a digital sensor, or a scanned version of a traditional film-based mammogram set. An "image," as used herein, is assumed to be at least two-dimensional data in a suitable digital representation for presentation to CAD algorithms, without distinction to the capture mechanism originally used to capture patient information. The CAD algorithms search the image for objects matching a signature of interest, and alert the radiologist when a signature of interest is found.

One signature of interest is a microcalcification. Existing CAD algorithms use various strategies to locate potential microcalcifications. In U.S. Pat. No. 6,014,452, all pixels having an intensity above a global fixed threshold are used as seed locations for potential microcalcifications. U.S. Pat. No. 6,801,645 applies a difference of Gaussians filter to enhance microcalcifications, and then thresholds. U.S. Pat. No. 7,593,561 applies a fixed filter that enhances contrast at an image location when a central 3×3 pixel region is brighter than pixel rings three and six pixels from the image location, and then adaptively and iteratively thresholds the adjusted image to obtain a desired number of clusters.

Another signature of interest is a microcalcification cluster. Existing CAD algorithms use various strategies to label potential microcalcification clusters as suspicious, including trained neural networks and feature-weighted linear discriminants, as demonstrated in U.S. Pat. No. 7,593,561.

Classification of anomalies may be performed using a probability density function (PDF) that describes the relative likelihood of observing any given sample value of a random variable. The integral of a PDF over all possible values is 1; the integral of a PDF over a subset of the random variable's range expresses the probability that a drawn sample of a random variable will fall within that range.

PDFs that can be expressed by a closed-form equation are generally well understood, and many applications for such PDFs have been developed. On the other hand, the practical estimation of a PDF for a complex multidimensional random variable, particularly one with an unknown and possibly irregular distribution in each dimension, and/or long, sparsely populated tails, has in large part eluded researchers. In the area of pattern and image recognition, for instance, many researchers have abandoned PDF approaches and concentrated on known solvable alternatives, such as Neural Networks and linear discriminant functions, due to the practical difficulties in applying a PDF approach.

BRIEF DESCRIPTION OF THE DRAWINGS

The following is a brief description of the drawings, which illustrate exemplary embodiments of the present invention and in which:

FIG. 6 depicts object boundary rings as used in one step of FIG. 2;

FIG. 7 illustrates boundary distance mapping as used to weight pixels within an object boundary in an embodiment;

FIG. 16 shows steps in a two-stage clustering technique according to an embodiment;

FIGS. 19a and 19b illustrate a classifier probability unit in accordance with an embodiment;

DETAILED DESCRIPTION OF ILLUSTRATIVE EMBODIMENTS

Figure 1:
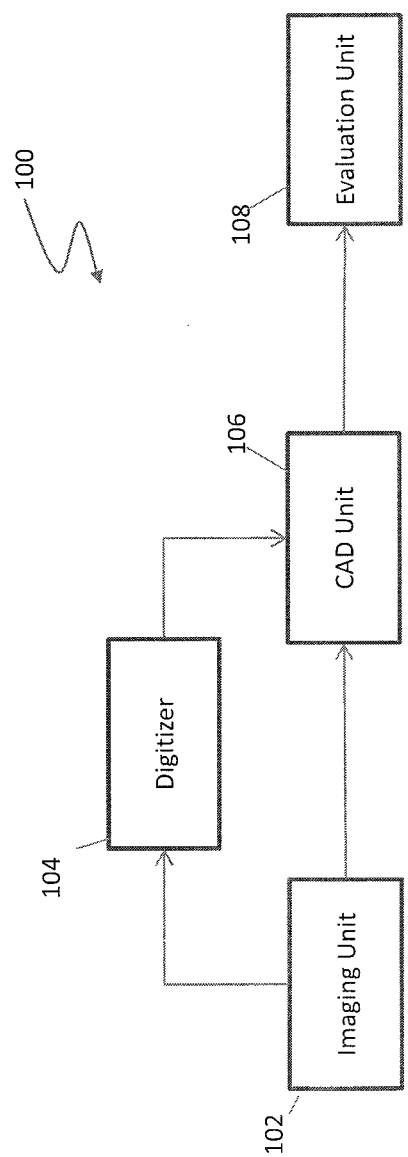
FIG. 1 is a system-level diagram for an anomaly detection system in accordance with an embodiment.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram by locating and classifying possible anomalies for review by medical personnel. Other embodiments, however, may be used for other situations, including, for example, detecting and classifying anomalies in other tissues such as lung tissue, any type of image analysis for statistical anomalies, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Referring first to FIG. 1, a system 100 for assisting in detecting anomalies during, for example, mammograms, is illustrated in accordance with an embodiment. The system 100 includes an imaging unit 102, a digitizer 104, and a Computer-Aided Detection (CAD) unit 106. The imaging unit 102 captures one or more images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
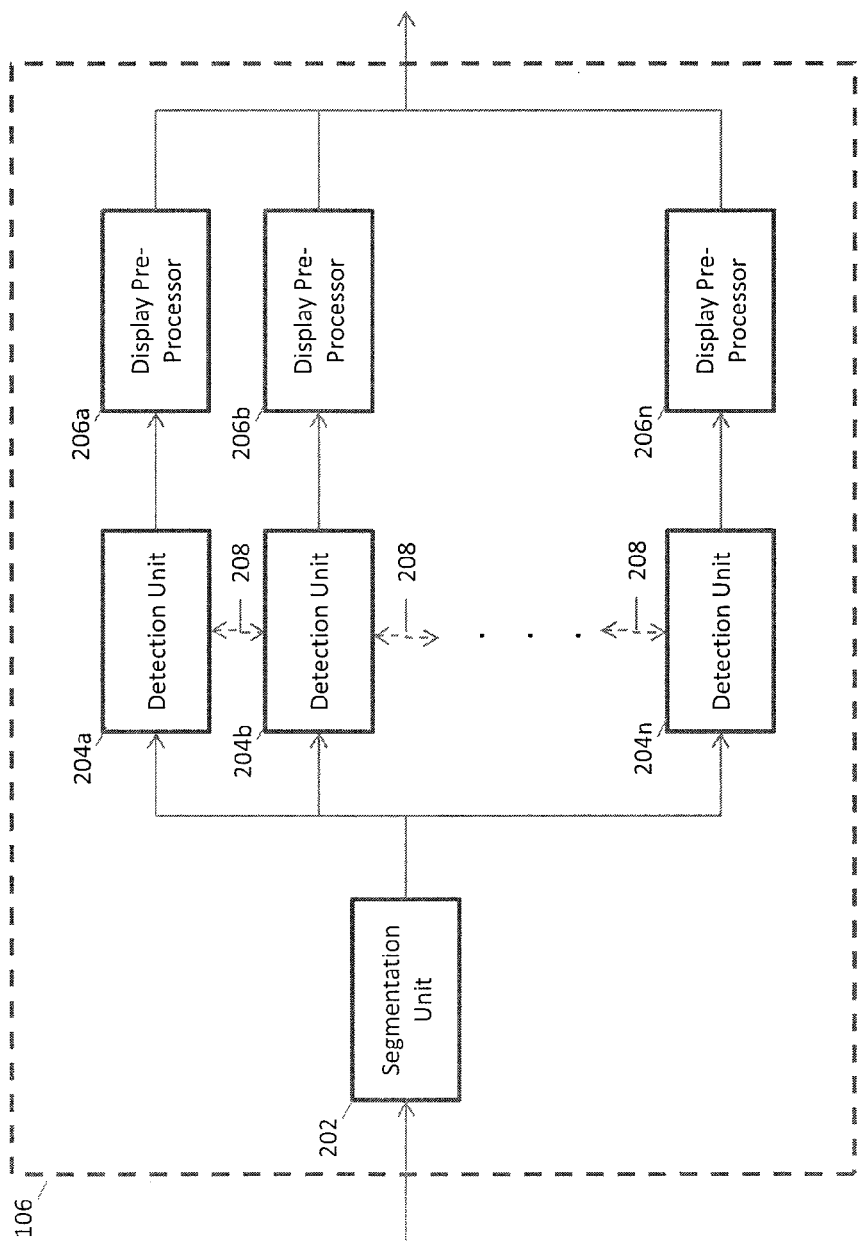
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line (e.g., solid lines), while spiculations (or other type of anomaly) may be indicated by a line encircling the area of concern by another type of line (e.g., dashed lines).

Figure 3:
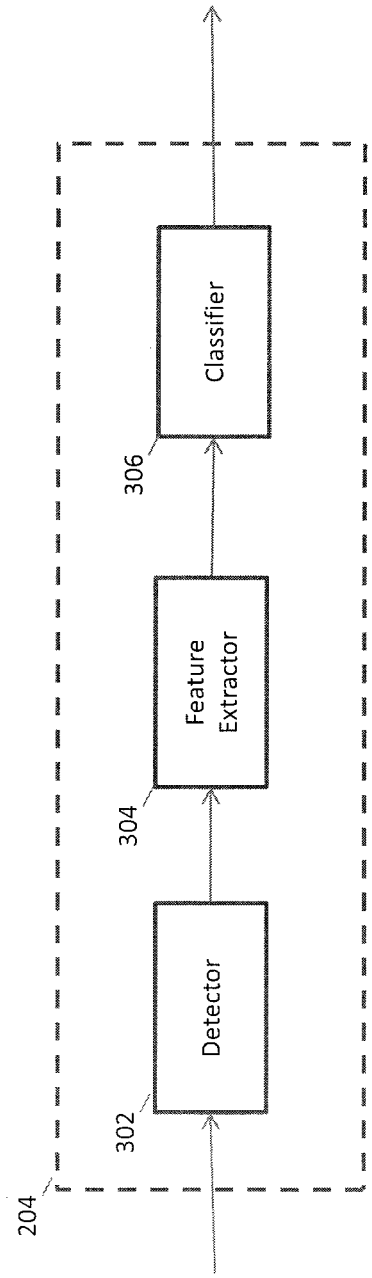
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the probability is compared to a threshold to determine whether or not a detected region is to be reported as a possible area of concern.

A suitable segmentation unit 202 is specified in U.S. Provisional Application Ser. Nos. 61/400,573 and 61/398,571, a suitable detection unit for detecting and classifying malignant masses is specified in U.S. Provisional Application Ser. No. 61/343,552 and co-filed U.S. PCT Patent Application Ser. No. PCT/US11/34698, a suitable detection unit for detecting and classifying spiculated malignant masses is specified in U.S. Provisional Application Ser. No. 61/395,029 and co-filed U.S. PCT Patent Application Ser. No. PCT/US11/34699, a suitable probability density function estimator is specified in U.S. Provisional Application Ser. No. 61/343,608 and co-filed U.S. PCT Patent Application Ser. No. PCT/US11/34700, and suitable display pre-processors are specified in U.S. Provisional Application Ser. Nos. 61/399,094, all of which are incorporated herein by reference.

The following paragraphs provide greater details regarding a microcalcification detection unit, such as may be utilized as one or more of the detection units 204a-204n (see FIG. 2) in accordance with an embodiment. In particular, the following paragraphs explain the detection and classification of an object as a possible microcalcification and the detection and classification of groupings of possible microcalcifications objects as a microcalcification cluster.

Prior art approaches for locating potential microcalcifications in an image detect some easy-to-find signatures. What would be more beneficial to a radiologist is a detection system that can work on radiographic images obtained using a variety of capture systems, to detect hard-to-find microcalcifications and point out their locations to a radiologist. The embodiments described herein work with a large range of capture systems to produce a list of "peaks," i.e., potential microcalcification locations, and refining these into object descriptions for processing by a microcalcification classifier/recognition system.

As opposed to prior art approaches, the embodiments described herein work at a priority of "scales" to detect peaks before turning these into objects. Each scale is optimized to detect peaks in a certain absolute size range. Because finding microcalcifications based on absolute intensity or edge strength can be problematic, the preferred embodiments use a contrast ratio based on a large neighborhood average value, e.g., a median measurement. Preferably, objects found at a smaller scale that are above a given contrast ratio are excluded from median calculation at higher scales, thus further improving detection performance.

Prior art approaches for labeling microcalcifications as suspicious rely on approaches in which it is difficult to systematically separate cancerous from benign signatures, or understand why a system is performing or not performing as desired. The system described herein uses probability density functions, in a three-stage classifier, to robustly model distributions for a variety of features in what is believed to be a near-optimal manner at each stage, in order to classify microcalcifications. The overall structure of the classification process, as well as the individual stages, feature sets, coordinate system, and many of the individual features, are believed novel.

Figure 4:
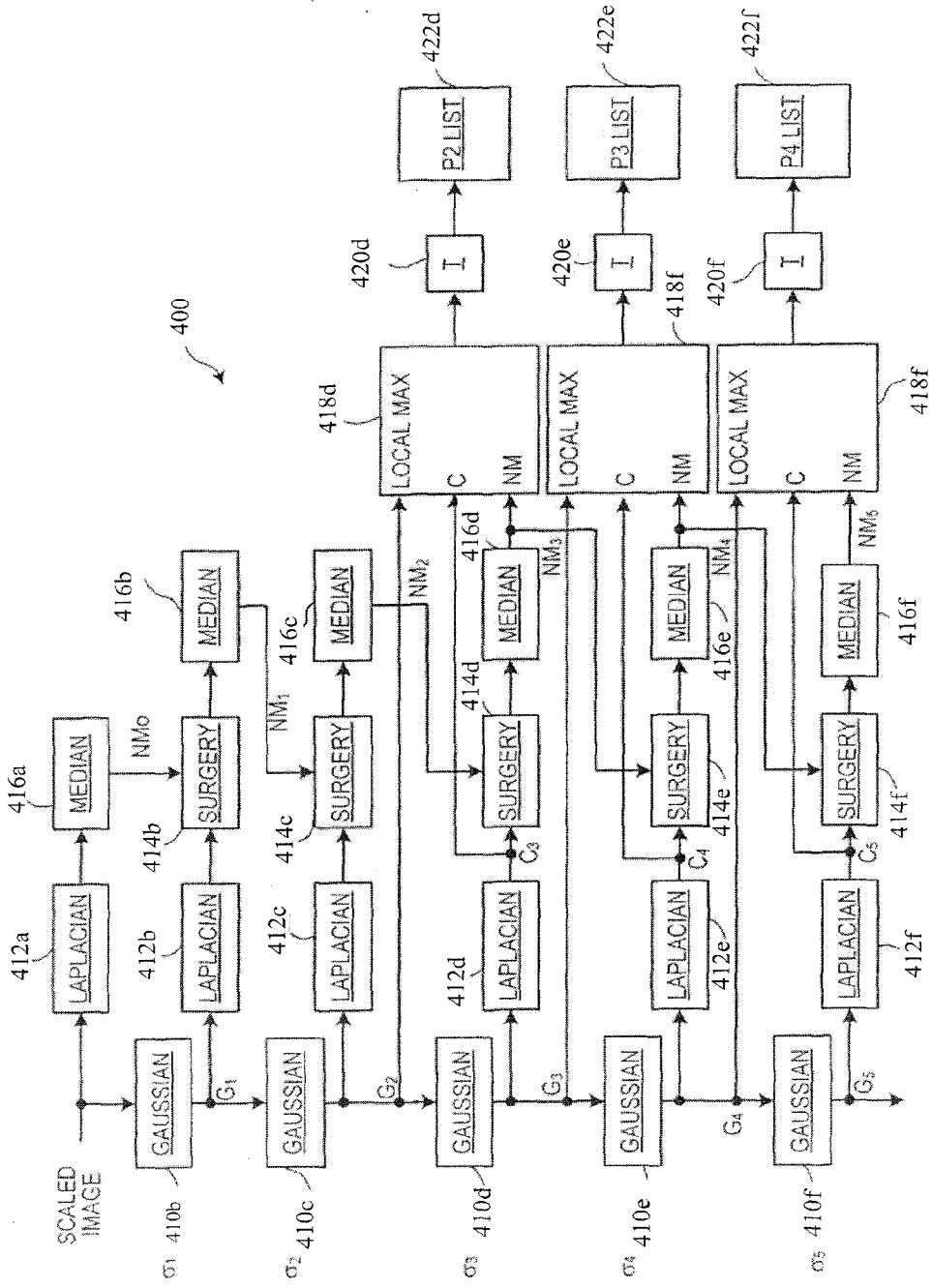
FIG. 4 contains a block diagram for a peak detection processing system according to an embodiment.

Referring now to FIG. 4, there is illustrated peak detection according to an embodiment 400. Preferably, the image is rescaled, if necessary, to about a 40 micron pixel size prior to running the peak detection procedure. Other scales can be used, but the 40 micron size has been found to provide adequate feature detail without creating an undue processing burden. As different film scanners and digital capture systems can present different input pixel resolutions to the CAD system, an input pixel resolution parameter is used to determine scaling. For a mammogram, the image is preferably pre-processed to segment areas representing breast tissue for processing, and to remove artifacts such as scratches and other bright lines prior to microcalcification detection.

The scaled image is recursively convolved with a Gaussian kernel in stages 410b-410f to produce smoothed images at a variety of scales, one image for each filter recursion. Several mathematical properties of Gaussian pulses are used to advantage to significantly reduce processing time. First, as the convolution of two Gaussian pulses, with standard deviations $\sigma_1$ and $\sigma_2$, produces a Gaussian pulse with standard deviation $\sqrt{\sigma_1^2+\sigma_2^2}$, smoothed images at larger scales are produced by repeated convolution with smaller kernels, instead of a single convolution with a large kernel. Second, since a two-dimensional circularly symmetric Gaussian pulse is linearly separable into two one-dimensional Gaussian pulses (one 1×n pixels and the other n×1 pixels in size, where n is truncated at approximately plus and minus $3\sigma$, expressed in pixels, for processing efficiency), each convolution is further optimized using two one-dimensional convolutions truncated at $3\sigma$ on each side of the peak. Of course, one who was not interested in computational efficiency could optionally select to use only one, or neither, of these techniques.

In a preferred embodiment, the scales are selected such that the variance doubles from one scale to the next, e.g., $\sigma_{n+1} \leq \sqrt{2}\sigma_n$, such that the Gaussian-smoothed images select to spot sizes that double in area with each increase of scale. This requires that for each step, the Gaussian kernel applied has the same standard deviation as the current cumulatively applied standard deviation. The first stage processing uses $\sigma_0=0$, e.g., no additional blur is applied over whatever exists in the scaled input image. For the first and second blur steps ($\sigma_1$ and $\sigma_2$), the applied kernel in Gaussian filters 410b and 410c has a standard deviation of $25\sqrt{2}$ microns, such that the second and third stage input images represent Gaussian-blurred versions of the input image with respective blur standard deviations $\sigma_1=35$ microns (approximately) and $\sigma_2=50$ microns. The third blur step applies a Gaussian kernel with standard deviation 50 microns, such that the fourth stage 410d output blurred image has a blur standard deviation of $50\sqrt{2}$ microns. Continuing in likewise fashion, additional stages 410e, 410f, etc., receive blurred images with blur standard deviations (rounded in some cases) of 100 microns, 140 microns, 200 microns, 280 microns, etc. In one embodiment, the stages are truncated once the blur standard deviation roughly equals the radius of the largest calcification size of interest, e.g., about 300 microns. Other scale-stepping strategies can be employed, but extensive testing has shown this strategy to be robust for detecting a wide variety of spot sizes.

Each processing stage receives its Gaussian-blurred image (the first stage image is not blurred) and convolves that image with a Laplacian function, or other second derivative function, in a Laplacian filter stage. The Laplacian function produces a "curvature" image, e.g., flat or linearly sloping image areas produce a zero output response, a positive peak produces a positive output response, and a negative peak produces a negative output response (saddle points and image areas curving in one direction can also produce a response).

At the first Laplacian filter stage 412a, the output of the Laplacian filter is supplied to a median filter 416a, which calculates the median absolute curvature in a local neighborhood, e.g., a 4 mm area (100×100 pixels) centered on each pixel. The median filter 416a produces a neighborhood median output image $NM_0$ for use by the $\sigma_1$ processing stage.

At the $\sigma_1$-scale stage, the Gaussian-smoothed image from filter 410b is input to a Laplacian filter stage 412b, which detects curvature in the smoothed image. The curvature image is input to a "surgery" stage 414b. The surgery stage compares, for each pixel location, the pixel relative contrast (Laplacian value divided by the neighborhood median $NM_0$ at the same pixel location) to a threshold for that scale. In one embodiment, the threshold for a scale is a multiple of a global (taken over all breast area in the current image) median absolute deviation, where the multiple is experimentally determined for a given image capture device characteristic (multiples of 3 to 5 are typical). Those Laplacian pixels that are outliers are marked as such in a surgery mask at surgery stage 414b. Also, pixels surrounding a pixel marked for surgery are also marked in the surgery mask, with the dilation of the mark a function of the current scale standard deviation. Dilation values of around three times the current scale standard deviation provide acceptable performance in a tested embodiment.

The surgery mask is passed to neighborhood median stage 416b. As stage 416b calculates a neighborhood median at a particular pixel, it excludes the pixels marked for surgery, and counts the number of valid pixels. The number of valid pixels is also saved for the current pixel. If too many pixels are excluded from the neighborhood median calculation of a pixel marked for surgery, that pixel's neighborhood median is replaced with the median value of their neighboring non-masked pixels. This prevents areas of high curvature from skewing the median calculation for the next stage. Median filter stage 416b thus produces a neighborhood median output image $NM_1$ based on the output of surgery stage 414b.

At the $\sigma_2$-scale stage, the Gaussian-smoothed image from filter 410c is processed through a Laplacian filter 412c, a surgery stage 414c, and a median filter stage 416c, which function identically to the corresponding filters in the $\sigma_1$-scale stage. Identical processing occurs in the later stages as well.

Beginning with the $\sigma_3$-scale stage, the system searches for potential microcalcification peaks. A peak detector 418d receives three input images: the Gaussian-smoothed output image $G_2$ (with a 50-micron Gaussian-blur standard deviation applied) from filter 410c; the curvature image $C_3$ output from Laplacian filter 412d; and the neighborhood median image $NM_3$ from median filter 416d. The peak detector searches Gaussian-smoothed output image $G_2$ for pixels that are local maxima (greater intensity than all eight neighbors). For each pixel $G_2(i,j)$ that is a local maxima, peak detector 418d calculates a noise-normalized contrast ratio CR as the ratio $C_3(i,j)/NM_3(i,j)$.

A threshold stage 420d receives the local maxima $G_2(i,j)$ positions and contrast ratios. Threshold stage 420d applies a contrast ratio threshold, which can be experimentally selected for a given set of input image characteristics to achieve a desired sensitivity, e.g., calculated in similar fashion to the surgery threshold. The local maxima locations with a contrast ratio higher than the threshold are stored in a peak list 422d for further processing.

Similar peak detection and thresholding is performed at subsequent scales to create additional peak lists 422e, 422f, etc.

Figure 5:
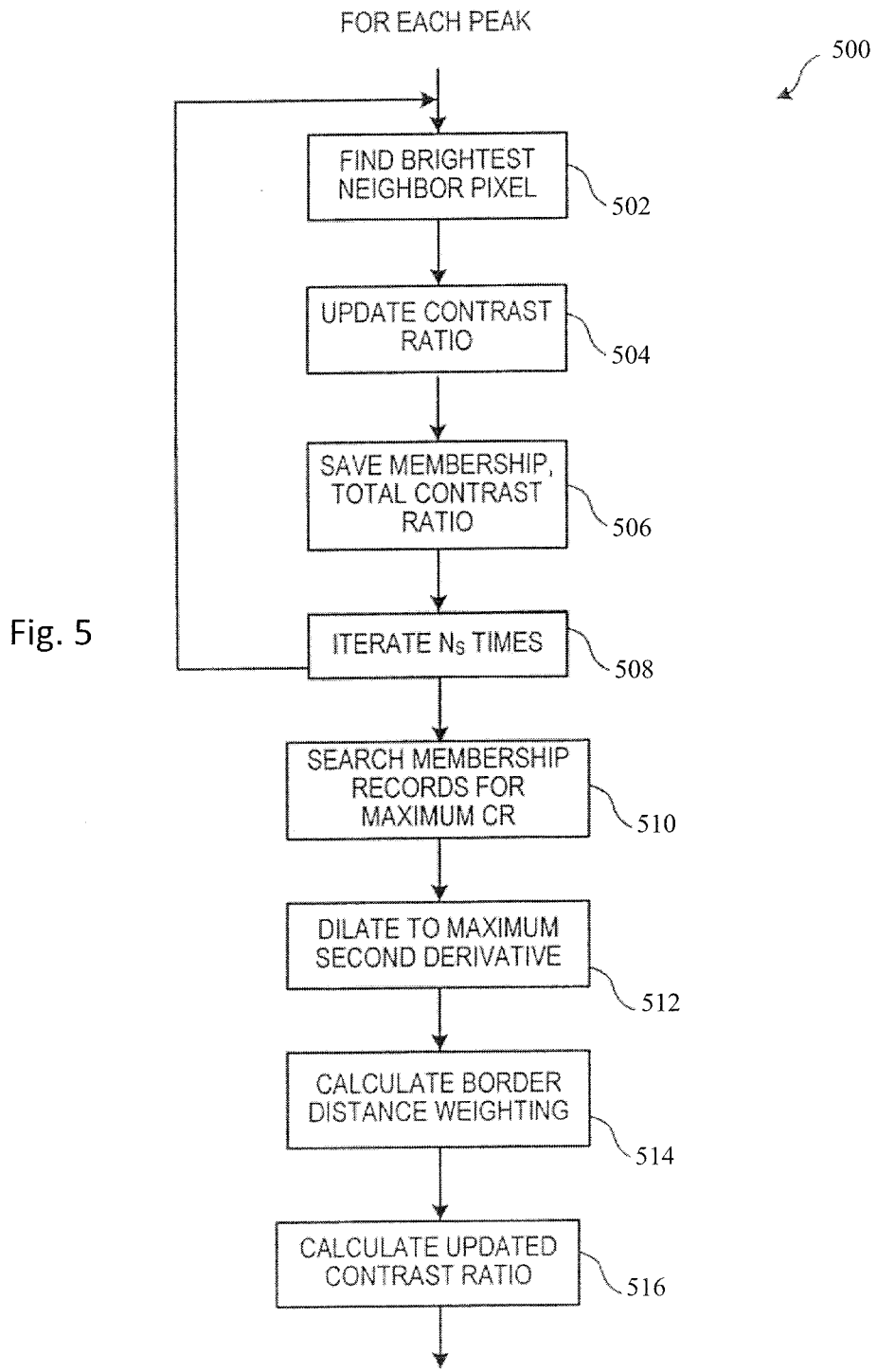
FIG. 5 contains a flowchart for an object boundary determination procedure according to an embodiment.

The peaks in each peak list are next examined individually, and grown into objects to match their apparent size and shape, using the image output by Gaussian filter 410b (e.g., a slightly smoothed version of the original image). FIG. 5 presents a flowchart 500 showing how this is accomplished for one peak. Each object starts out as a single pixel peak with a relative contrast ratio. Block 502 examines the neighbors of the peak pixel, in the smoothed image at the same scale that the peak was found, and selects the brightest neighbor for inclusion with the peak pixel as part of the object. Block 504 calculates a cumulative contrast ratio CR for the object as then defined, by adding the contrast ratio for the selected neighbor to CR as it existed prior to the neighbor's selection. Block 506 then updates an object membership list with the new pixel's identity and the updated CR. Block 508 iterates back to block 502 a total of $N_S$ times, where $N_S$ depends on the scale at which the peak was detected, and is large enough to describe the total object membership for peaks matched to that scale (thus $N_S$ increases roughly proportional to the square of the scale).

At each iteration, block 502 selects the next-brightest pixel neighboring the already-included pixels. After $N_S$ such iterations, the membership list created by block 506 contains a list of the object member pixels, in the order in which they were added, and the cumulative CR at each step. Block 508 passes control to block 510, which searches the membership list for the membership having the maximum CR. The object membership is pruned back to this level.

Process 500 next refines the object boundary using a dilation step 512, as the previous growth process tends towards under-inclusion. Referring to FIG. 6, an exemplary object boundary 602 is depicted, surrounded by three concentric rings 604, 606, 608, spaced at one-pixel distances from the object boundary. Dilation step 512 traverses each ring and computes at each pixel an average intensity, and also traverses the boundary ring 602 of the object and computes an average intensity. A second derivative for ring 604 is calculated as the summed average intensities of rings 602 and 606, minus twice the average intensity of ring 604. A second derivative for ring 606 is calculated as the summed average intensities of rings 604 and 608, minus twice the average intensity of ring 606. When the second derivative for ring 606 exceeds that of ring 604, ring 604 is added to the object, and the process repeats (with a new ring, not shown, added for calculation purposes). This process continues until a maximum allowable dilation is reached, or until a decrease in second derivative is observed for the newly added ring.

After dilating the object membership to find the approximate maximum extent of the object, process 500 calculates an object contrast ratio based on the membership. In one embodiment, a weighted average intensity value is calculated, where pixels closer to the object boundary receive less weight in the average.

One way of assigning object boundary distance is with an erosion function. FIG. 7 shows an exemplary erosion map 700 for a dilated object boundary. A counter for each pixel is incremented, and pixels at the boundary of the object membership (one of the four left, right, up, down neighbors are not members) are eroded away. This process continues until all pixels are eroded, such that the pixel loop counters indicate a distance from the object border. The distances are then inverted as shown in inverted erosion map 710, e.g., if M is the maximum boundary distance assigned to a pixel in erosion map 700, the inverted erosion map values are assigned as I=M-D, where D is the map 700 distance and I is the map 710 distance.

Erosion map 710 is used to weight pixels in a contrast ratio calculation. In one embodiment, the pixels are weighted according to a Gaussian weighting function, normalized for the maximum boundary distance from map 710, such that pixels at maximum distance from the boundary receive a weight of 1 and pixels at the boundary receive a weight of $e^{-1/2}$. Finally, process 500 block 516 calculates an updated, weighted contrast ratio WCR for the object. Weighted contrast ratio WCR uses, in one embodiment, a numerator that is the average of the intensity values for each member pixel, weighted by the Gaussian weighting function, minus the average of nearby border pixels, and a denominator that is the sum of the neighborhood median values for each member pixel, weighted by the Gaussian weighting function.

It is possible that a potential microcalcification forms a peak at two or more different scales. To avoid duplication of objects in the object list, object position is compared for objects occurring in different scales. Close in proximity objects are checked for overlapping pixels; when the intersection of the member pixels of the two objects exceeds an overlap ratio (e.g., 80% of the pixels associated with one of the objects), the object with the lower relative contrast WCR is discarded.

Figure 8:
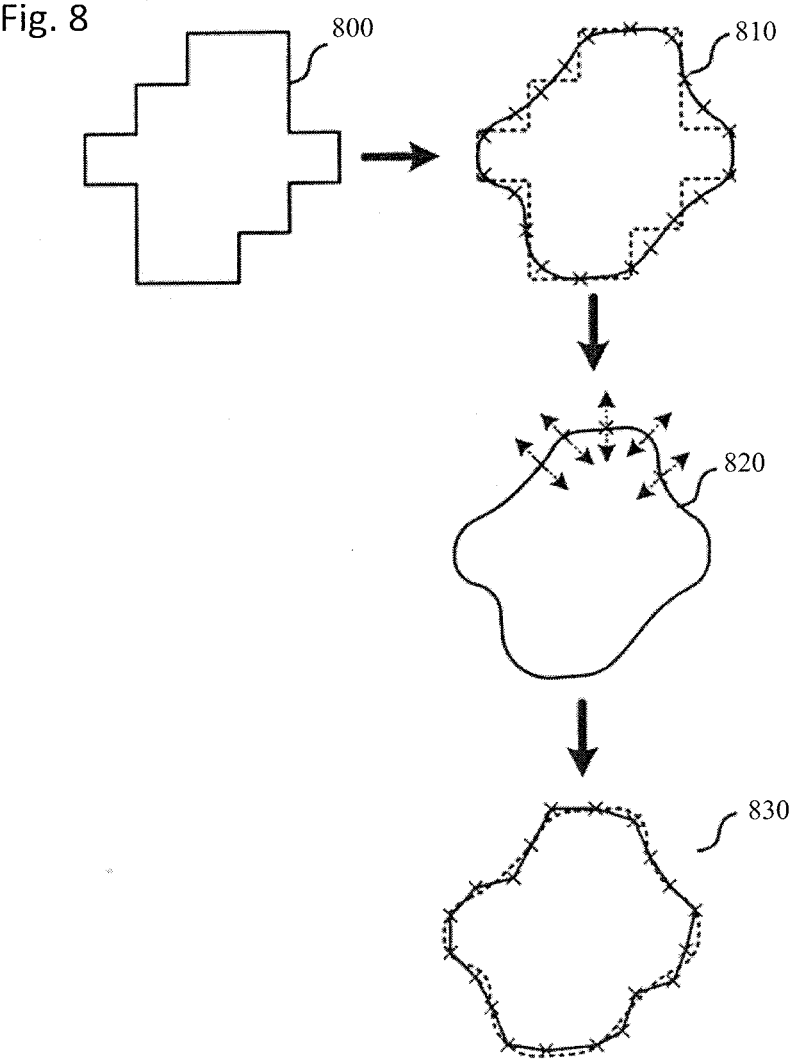
FIG. 8 shows steps in a further refinement of the boundary associated with an object according to an embodiment.

As the boundary refinement in process 500 uses average values of an entire pixel ring to dilate object membership, it has been found that the accuracy of many object features can benefit from a fine boundary refinement. All objects remaining after the duplication check are thus subjected to further refinement as follows. FIG. 8 shows an exemplary rough, pixel-level quantized boundary 800 resulting from the first-stage boundary definition. Fine boundary refinement creates a boundary point list 810, where the points are "moved" from quantized boundary 800 to remove high-frequency corners, e.g., creating a "smoothed" boundary. From the smoothed boundary point list 810, the system calculates a set of normal vectors 820, one at each point. Each point in list 810 can then be set to a final position that is at one of five possible positions along the normal vector: 0, +0.5, +1, −0.5, or −1 pixels from the starting smoothed position. The final position 830 selected is determined based on maximum second derivative measured along the normal.

Figure 10:
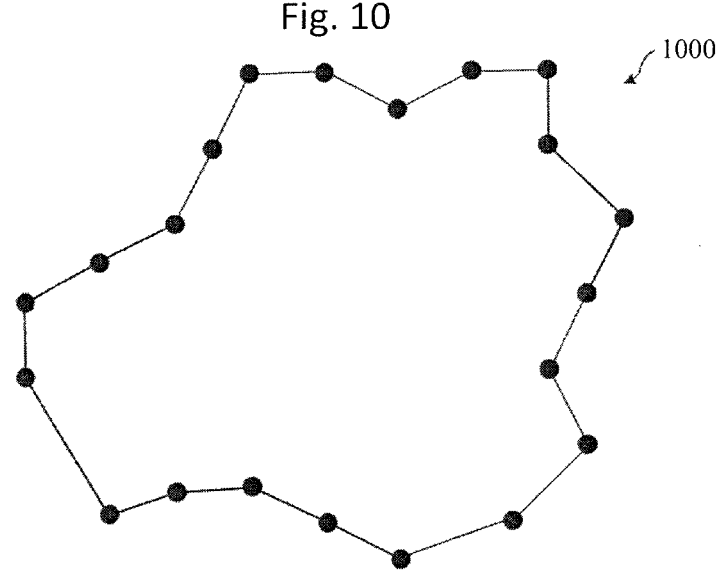
FIG. 10 shows a boundary description for a segmented object, for use in describing object feature calculation in the following figures.

After the potential microcalcification detection stage described above supplies the system with a description of objects of interest in an image, along with a description of the object extent in the image, the objects may be classified and evaluated in various groupings to detect and classify clusters of microcalcifications. Preferably, the detection stage does not attempt to exclude visible (to the detection algorithm) objects with a significant signal-to-noise ratio, such that a wealth of classifiable objects of different types (if such exist in the image) is passed to the system. Although the object extent can be described as an image mask or pixel list, a preferred object extent description is a boundary point list, with sub-pixel precision, such as that shown in the exemplary object 1000 shown in FIG. 10. It is understood that pixel interpolation can be used to obtain an image value at any point needed by the system. Also preferably, the input image is sampled, or resampled, if necessary, to the same resolution as that of a training image set (to be described further below). In one embodiment, the input resolution is 40 microns/pixel.

Figure 9:
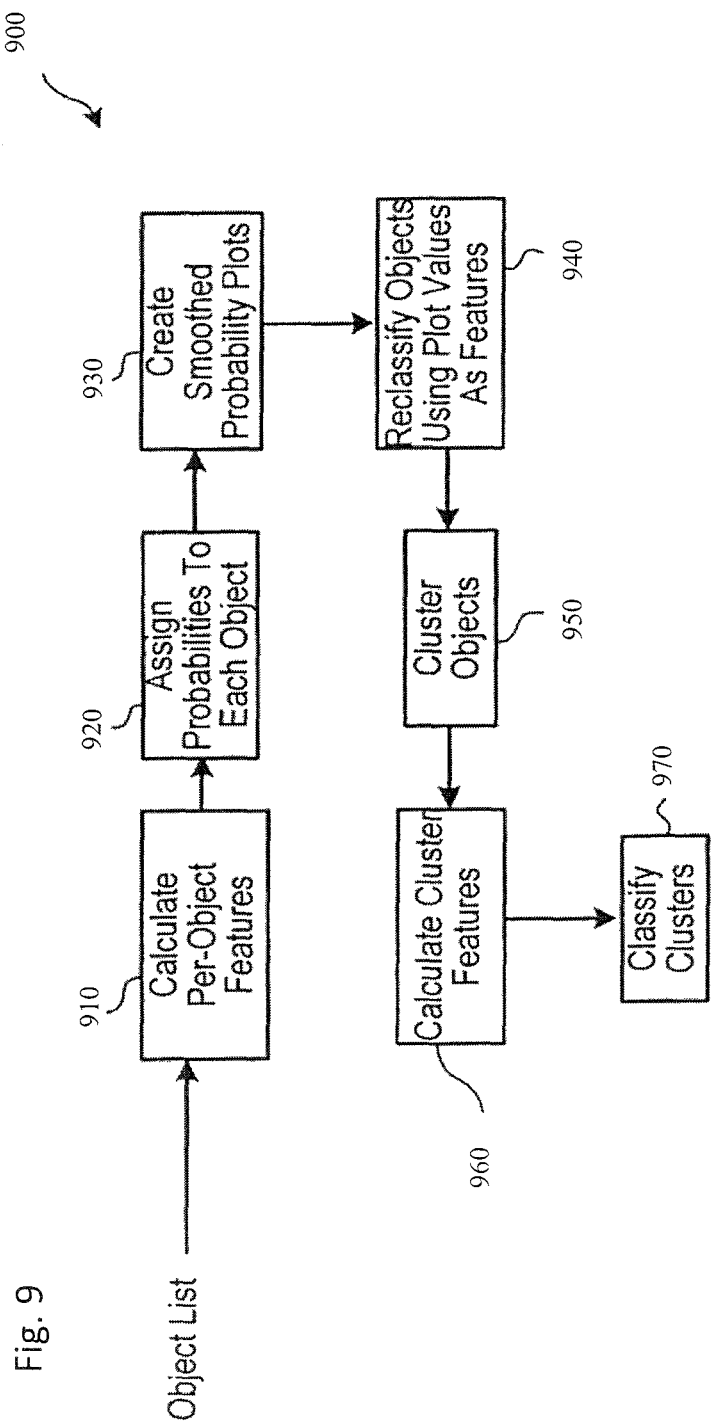
FIG. 9 contains a block diagram for a microcalcification classification process according to a first embodiment.

FIG. 9 contains a block diagram 900 for an overall classification process according to an embodiment. The object list for the image is first received by a feature calculation stage 910, which calculates a feature set for each object. A first classification stage 920 next assigns six probabilities to each object, one probability for each of six different object types. Next, a probability plot stage 930 creates smoothed probability versus location plots based on the probabilities obtained from classification stage 920. A second classification stage 940 assigns five probabilities to each object, one probability for each of five different object types. An object clustering stage 950 gathers objects with some indication of potential malignancy, and in close proximity, into clusters. For each cluster, a cluster feature calculation stage 960 computes features for the cluster. Finally, a third classifier 970 determines the probability that a cluster is malignant.

The first classification stage assigns six probabilities to each object based on its individual features as calculated in block 910. The individual features used in one embodiment are as follows: contrast ratio, aspect ratio, width, invexity, edge variance, and ridge ratio. Each will be described in turn.

Contrast ratio is a feature based on local intensity and noise statistics. A two-dimensional Laplacian-of-Gaussian (LoG) filter is calculated on the input image, with a Gaussian smoothing standard deviation of 35 microns. An average noise figure is obtained by calculating the median absolute LoG filter output NM in a neighborhood surrounding the object. An average relative contrast C for the object is calculated by averaging the smoothed image intensity within object boundary 1000, and subtracting the smoothed average intensity value just outside the boundary 1000. In one embodiment, the image intensity within object boundary 1000 is weighted such that pixels near the boundary receive less weight in the calculation. The contrast ratio CR is defined as C/NM.

Figure 11:
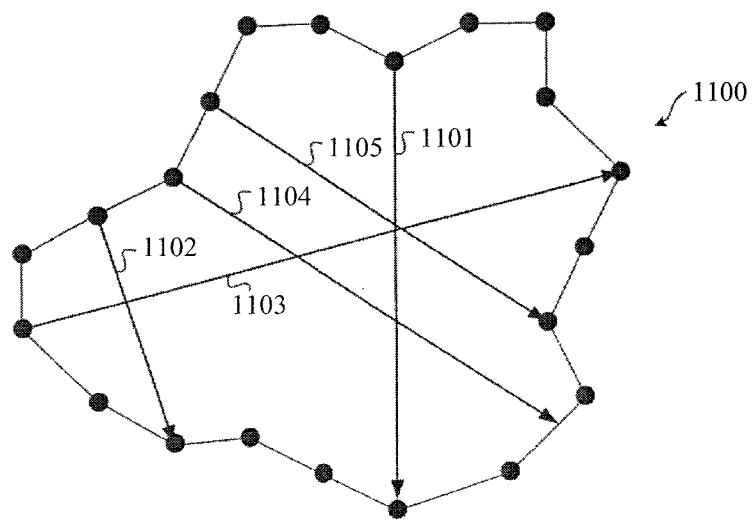
FIG. 11 depicts aspect ratio measurements for the FIG. 10 boundary description.

Aspect ratio is a measurement of the elongation of the object. In one embodiment, a width measurement is taken from each boundary point for the object, normal to the boundary at that point, to the opposite edge of the object. FIG. 11 illustrates such measurements 1101-1105 for five of the points in the exemplary object boundary 1000. In an actual embodiment 21 measurements would be made for this object, one for each of the 21 boundary points, with only five shown here for clarity. The aspect ratio AR uses two of the width measurements, the median width MED and the maximum width MAX, with AR defined as MAX/MED. The third feature, width W, is defined as MED.

Figure 12:
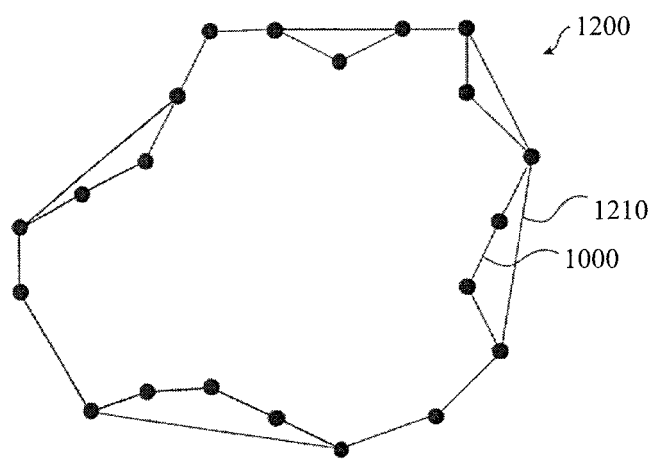
FIG. 12 illustrates the construction of a convex hull description for the FIG. 10 boundary description.

Invexity is a measure of the complexity of the object shape. As depicted in FIG. 12, a convex hull 1210 is constructed to enclose the object shape 1000. Invexity I has a maximum value of 1 for convex objects when defined as AO/ACH, where AO is the area of the object enclosed by boundary 1000, and ACH is the area of the convex hull. In a three dimensional embodiment, the three-dimensional convex hull may be divided into an upper hull and lower hull. Invexity I has a minimum value of 1 for convex objects when defined as VCH/VO, where VO is the volume of the object enclosed by lower hull and its intensity values 1000, and VCH is the volume of the convex hull. It should be noted that implementations may utilize minimum or maximum values. For example, in the embodiments given above, the two-dimensional example provides values between 0 and 1, such that a maximum value of 1 is obtained. In the three-dimensional embodiment, an inverse equation is used such that a value between 1 and infinity is obtained.

Figure 13:
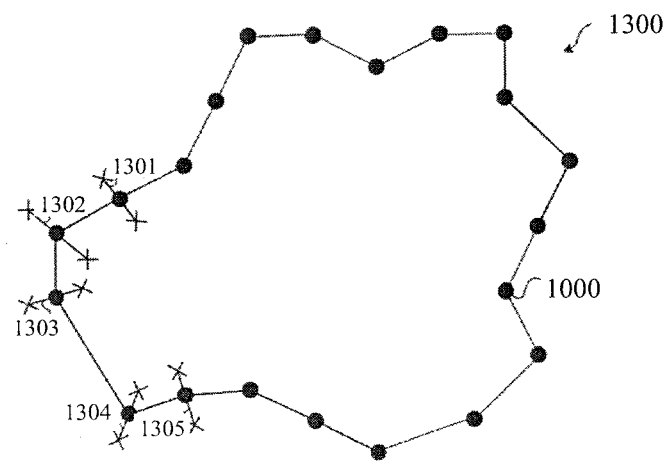
FIG. 13 illustrates measurements used in the calculation of an edge variance feature for the FIG. 10 boundary description.

Edge variance EV is a measure of the "texture" of the object edge. A raw difference measure AI is taken by calculating an intensity difference orthogonal to the boundary, between a point just inside the object and a point just outside the object. FIG. 13 illustrates such measurements 1301-1305 for five of the points in the exemplary object boundary 1000. In an actual embodiment 21 measurements would be made for this object, one for each of the 21 boundary points, with only five shown here for clarity. The differences AI are each normalized by the absolute mean of the differences, with the edge variance EV defined as the standard deviation of the normalized differences.

Figure 14:
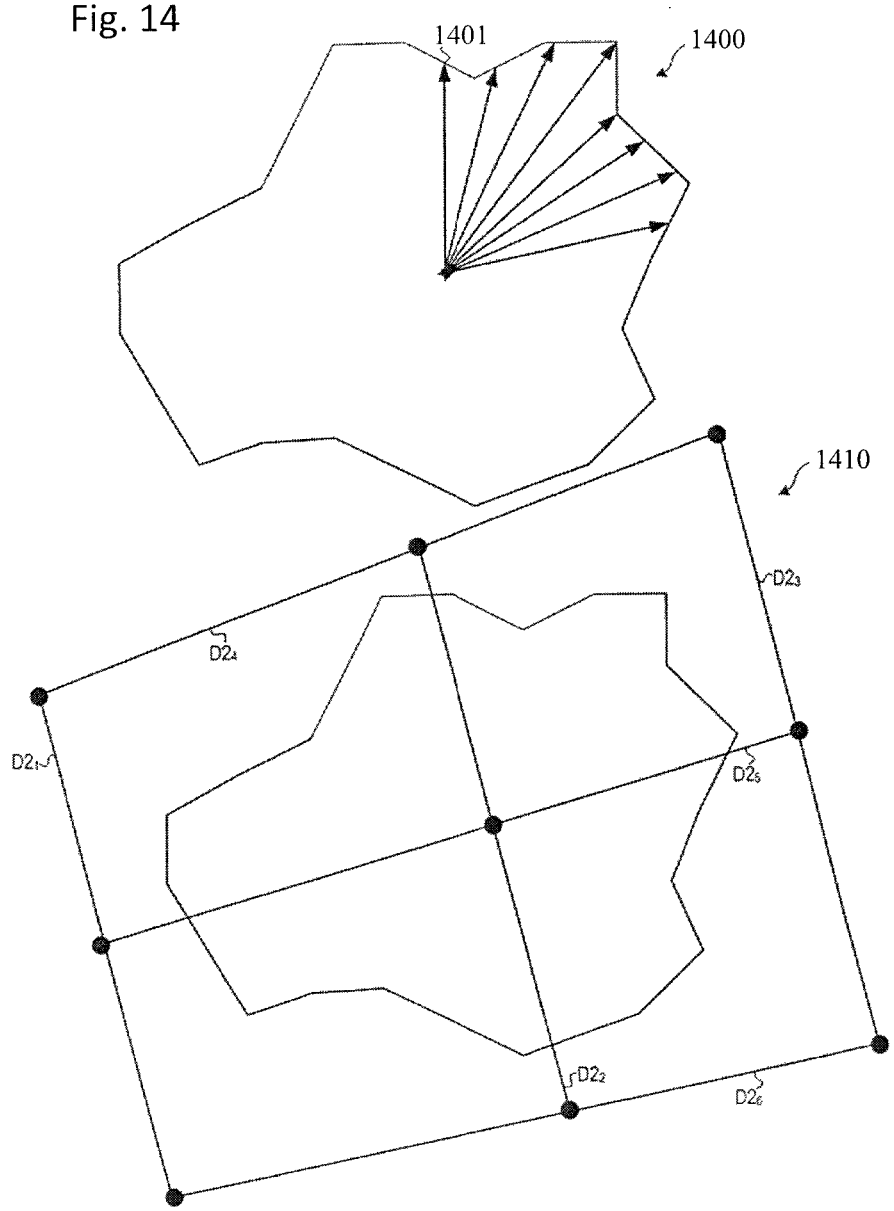
FIG. 14 shows the orientations used to calculate a ridge ratio feature for the FIG. 10 boundary description.

Ridge ratio RR is a measure of the differences in curvature observed for an object and for an area just outside the object. If an object curvature does not differ significantly from its neighborhood, it may indicate a slightly raised brightness region along a generally bright ridge, such as could occur for a vascular microcalcification. As shown in FIG. 14 for object boundary 1400, eight directions are considered, spaced 11.25 degrees apart (the first measurement direction, 1401, is labeled).

At each of the eight directions, nine sample points are calculated, with the center point located at the centroid of the object and the other nine points fanning out in a 3×3 grid oriented at the current direction. In one embodiment, each point other than the centroid should lie completely outside the boundary 1400.

With the nine points in place, six second derivatives are calculated, along the lines $D2_1$-$D2_6$. One ridge ratio is defined as $\frac{1}{2}(D2_1+D2_3)/D2_2$, and the other is defined as $\frac{1}{2}(D2_4+D2_6)/D2_5$. If either of these ratios is greater than the largest ratio observed so far for this object, the object ridge ratio RR is set to that value. After all eight orientations are checked, feature RR will represent the maximum of 16 measurements. A value near zero indicates it is more likely the object is not part of an extended ridge, while a value near one indicates it is very likely the object is part of an extended ridge.

During a training phase, the same object detection process and feature calculator are run on a training set containing a large number of radiographic images, with and without microcalcifications indicative of malignancy. Human-interactive classification, using one or more individuals with training in interpreting radiological images, indicates the type of calcification for each object found in the training set. In one embodiment, the possible calcification types include malignant, benign, lucent, vascular, scratch (film handling artifacts), and tissue (not a calcification). Using the training set objects, features, and human-input classification truthing, a probability density function (PDF) data set is calculated.

At runtime, the six object features calculated for each object are input to the first classifier 920. Classifier 920 consults the PDF data set, and based on the training data feature distribution six object features outputs six probabilities:

$P_{MC1}$ probability that object is a malignant microcalcification $P_{BC}$ probability that object is a benign microcalcification $P_{LC}$ probability that object is a lucent microcalcification $P_{VC}$ probability that object is a vascular microcalcification $P_{SCRATCH}$ probability that object is a film artifact $P_{TISSUE}$ probability that object is not a microcalcification or artifact Some object feature sets may be very indicative of a single object type, while other feature sets may produce a more ambiguous classification (i.e., similar feature sets have been observed for several types of objects). Accordingly, in one embodiment the single-object probabilities are fed to a second classification stage in which object classification can be influenced by the single-object classification of neighboring objects.

Figure 15:
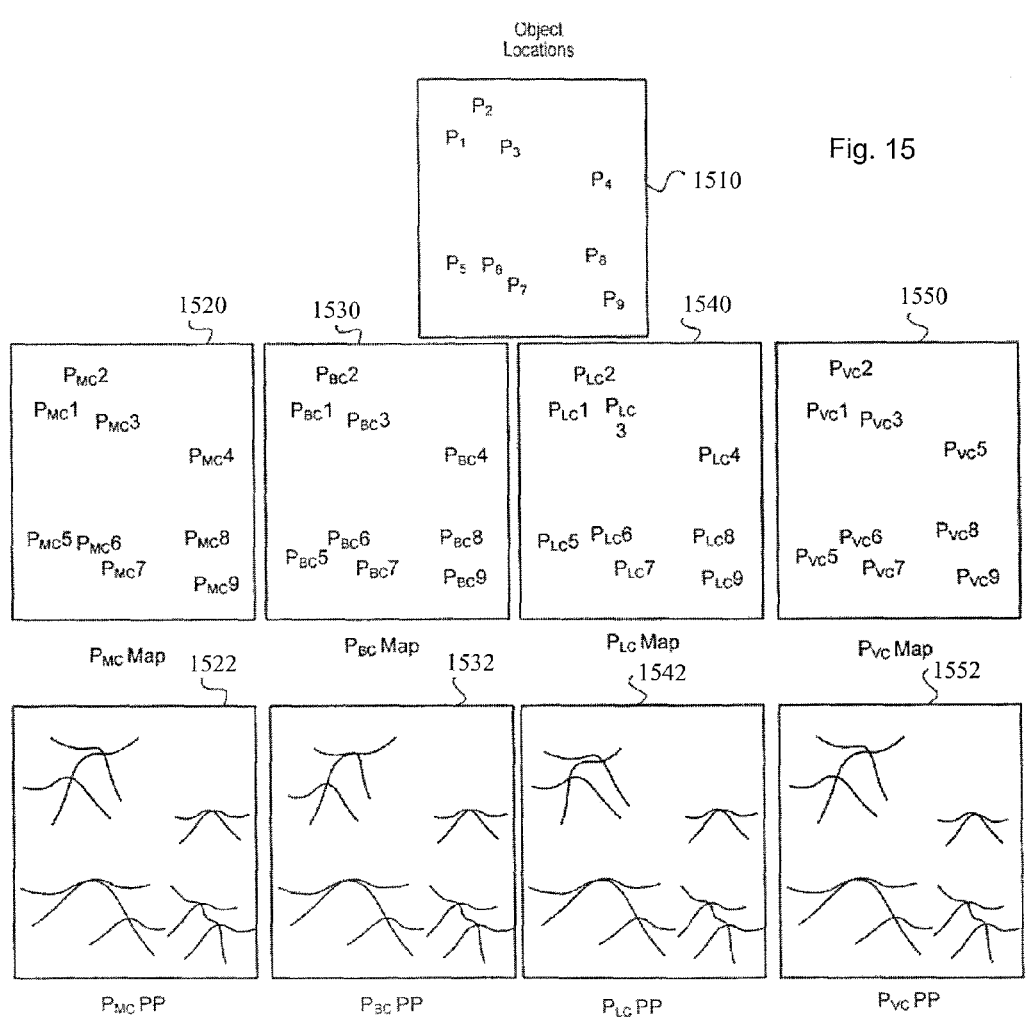
FIG. 15 illustrates the formation of neighborhood probability plots used in a second classification stage.

FIG. 15 illustrates the generation of probability plots for use in the second classification stage. A particular exemplary subimage 1510 contains nine objects, $P_1$ to $P_9$, distributed as shown on the subimage (the entire image is treated as described herein, with the subimage shown for clarity). Probability plot generation 930 (FIG. 9) creates four corresponding maps, a $P_{MC}$ map 1520, a $P_{BC}$ map 1530, a $P_{LC}$ map 1540, and a $P_{VC}$ map 1550. Each map is initially zeroed. In each map, at the location corresponding to object $P_1$, the respective classifier probabilities $P_{MC}1$, $P_{BC}1$, $P_{EC}1$, and $P_{VC}1$ obtained from classifier 920 are recorded. This process is repeated for objects $P_2$-$P_9$.

Once the object probability plots are generated, a Gaussian smoothing and normalization 1560 is applied to each plot 1520, 1530, 1540, and 1550 to produce corresponding smoothed probability plots 1522, 1532, 1542, and 1552. In each smoothed probability plot, a given object location is informed not just by its own first classifier value, but by the first classifier values of other local objects, with a contribution based on both probability and distance. One alternative to smoothing is to calculate, for each object, a contribution at its location from each other object (or each object within a significant distance) probability, distance weighted by a Gaussian function equivalent to the smoothing function.

The object locations and smoothed probability plots 1522, 1532, 1542, and 1552 are used to extract four features for each object value, as read from the corresponding locations on the four plots. These four features are an indication of the neighborhood surrounding each object. For instance, when a number of close objects have a high probability of malignancy, this increases the malignancy feature for all objects in the immediate area.

The four features obtained from the smoothed probability plots are input to a second classifier 940. Like the first classifier 920, classifier 940 relies on PDF data obtained from training sets. Classifier 940 outputs probabilities for five classes:

$P_{MC2}$ probability that object is a malignant microcalcification $P_{BC}$ probability that object is a benign microcalcification $P_{LC}$ probability that object is a lucent microcalcification $P_{VC}$ probability that object is a vascular microcalcification $P_{OTHER}$ probability that object is none of the above A cluster operation 950 groups objects together based on physical proximity. For an object to participate in clustering, its two malignant microcalcification probabilities, $P_{MC}1$ and $P_{MC}2$, must meet thresholds requirements, based on a desired sensitivity. For instance, FIG. 16 shows a line drawing of an image 1600, illustrating the locations of detected microcalcification objects that meet such thresholds. A subimage 1606 is shown below, magnified. In one embodiment, miniclusters are first formed by joining together the thresholded objects that are within a minimum distance of each other. For instance, unclustered objects are examined in turn, forming a minicluster with other unclustered objects located within a radius of approximately 1 mm. In subimage 1606, miniclustering results in three clusters, labeled I, II, and III.

Next, the miniclusters are treated as individual object locations for creating potentially larger clusters. Starting, e.g., at the minicluster with the largest number of objects (minicluster I in subimage 1606), a larger radius, e.g., approximately 5 mm is examined, and any miniclusters or objects located within the larger radius are joined (object IV in subimage 1606). A 5 mm radius of the new cluster is checked, resulting in cluster 2 being joined as well, and so on, resulting in the joining of object V and then cluster III in the FIG. 16 example. At each step in the clustering, a cluster is described by its members and by a convex hull that includes the members. Convex hull 1604 shows the final hull arrived at for the cluster in subimage 1606. Image depiction 1620 shows the clusters selected for the entire image. Any non-clustered objects are ignored after clustering.

A cluster feature calculation task 960 calculates the features to be used in the final classifier stage 970 (FIG. 9). The cluster features used in one embodiment are as follows: number of objects, aspect ratio of the locally concave hull, width of locally concave hull, maximum interdistance, inverse malignancy value, inverse benign value, inverse lucent value, and two breast coordinates x and y. Each feature will be described in turn.

The number of objects n is a self-descriptive feature. The system keeps a count of cluster membership as each cluster is formed, which at the end of clustering will contain n for each cluster.

Figure 17:
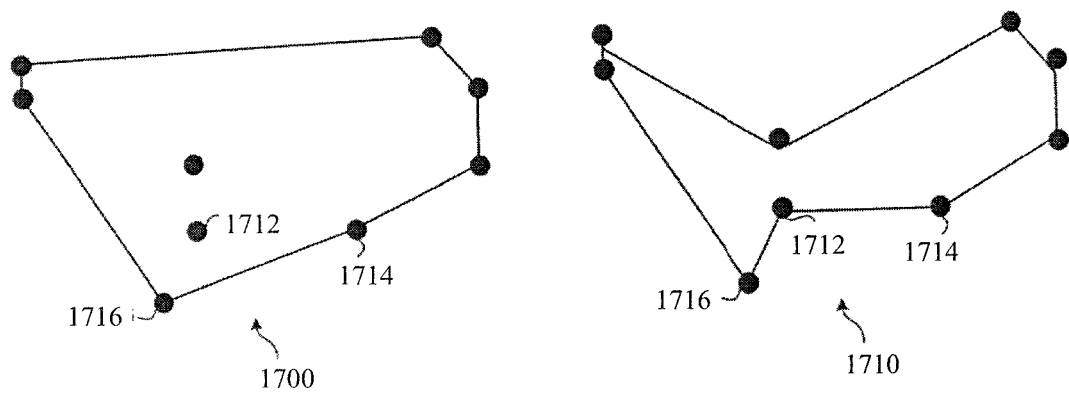
FIG. 17 depicts convex hull and locally-concave hull representations of cluster shape.

Aspect ratio of the locally concave hull uses a different polygon than that used to describe the cluster during the clustering operation. Referring to FIG. 17, polygon 1700 represents a convex hull formed around a cluster of objects (represented by x's). The convex hull, if traversed clockwise, is the minimum polygon that encloses all objects and can be traversed without making a left turn. For aspect ratio feature calculations, a locally concave polygon 1710 is formed from polygon 1700. Polygon 1710 is made locally concave by adding objects that lie inside polygon 1700 but near an edge to the boundary definition. For instance, object 1712 lines between objects 1714 and 1716. Polygon 1710 breaks the polygon 1700 line segment connecting objects 1714 and 1716 and replaces it with two line segments, one connecting objects 1712 and 1714 and the other connecting objects 1712 and 1716. Various constraints, such as maximum concave angle or minimum segment length that can be broken to add concavity, can be used to control the effect obtained.

The aspect ratio feature is calculated from polygon 1710. The feature calculator finds the second moments of the polygon (weighted by area, not by object location, in this embodiment). The ratio of the eigenvalues of the second moments (largest divided by smallest) is defined as the aspect ratio of the cluster.

The width of the locally concave hull is also calculated from polygon 1710. The maximum distance across polygon 1710 is found. The width is defined as the minimum width perpendicular to the maximum distance vector.

The maximum interdistance feature looks at pairs of neighboring objects in a cluster. "Neighboring" in this circumstance can be determined by assigning the closest two objects in the cluster as neighbors, the next two closest objects as neighbors, etc., until all objects in the cluster are connected by a neighbor tree. The length of the final connection made in this process is the maximum interdistance feature.

The next three features, inverse malignancy, benign, and lucent values, are calculated from the individual object probabilities output from the second-stage classifier. For example, for n objects, each assigned a probability of malignancy $p_M(i)$ by the second-stage classifier, the inverse malignancy value $INV_{MC}$ is defined as follows:

$$INV_{MC} = -\log\left(\frac{1}{n}\sum_{i=1}^{n} p_M(i)\right)$$

It has been found that probability distributions as features, when expressed in this manner, are easier to handle in the classifier. The benign and lucent inverse values are calculated similarly, except they respectively use the second-stage classifier object probabilities $p_{BC}(i)$ and $p_{LC}(i)$.

Figure 18:
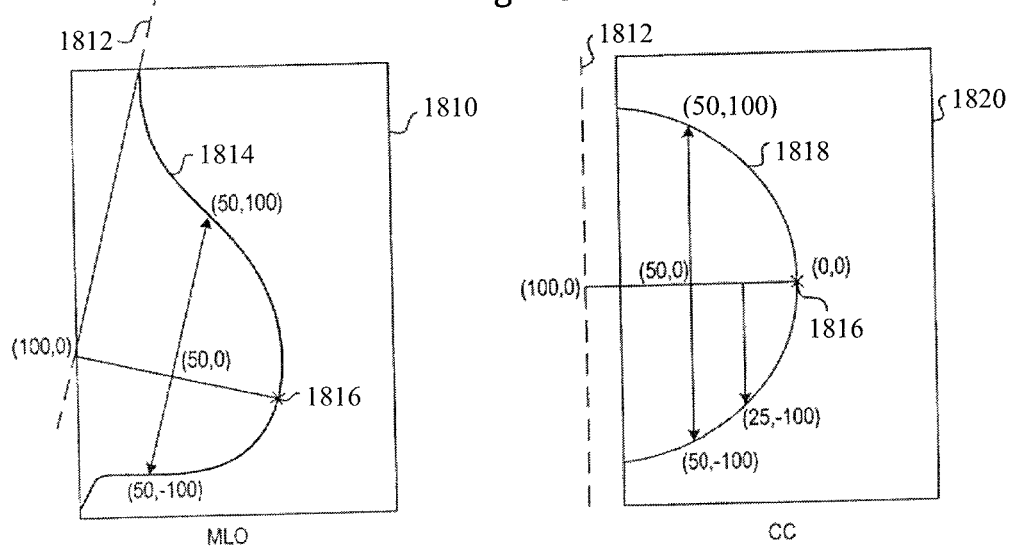
FIG. 18 illustrates a coordinate system adopted in an embodiment of the invention.

The final two features express the position of the cluster in the breast according to a novel coordinate system that allows cluster location to form a meaningful and classifiable feature, despite the large variation in patient size, breast size, and breast shape. Typical radiological views for mammography include a mediolateral oblique view (MLO, shown as view 1810 in FIG. 18) and a cranio-caudal view (CC, shown as view 1820 in FIG. 18). Other, less-common views are also occasionally taken, and can be expressed in similar coordinate systems.

The MLO view is segmented to find the pectoral line 1812 and the skin line 1814. The nipple 1816 is defined in the coordinate system as the point on the skin line furthest from the pectoral line 1812, measured orthogonal to the pectoral line. The x-axis of the coordinate system is the line running from the nipple point 1816 to the pectoral line 1812, with the value 0 lying at the nipple point and the value 100 lying at the pectoral line. The pectoral line may not actually be visible in the image at the x-axis position, but is assumed to extend as far as needed below the visible portion to form the coordinate system. Thus the x-coordinate of any point in the breast is the percentage of the distance from the nipple (front) of the breast to the pectoral line (back) of the breast.

The y-coordinate in the breast coordinate system is also expressed on a 0 to 100 scale (points below the x-axis are expressed on a 0 to −100 scale). The scale changes, however, with x-value, as 100 or −100 is defined, for a given x-coordinate, as the point orthogonal to the x-axis at the x-value where the skin line is crossed. Since the cross-sectional profile of the breast generally expands as one traverses the image from the nipple point to the pectoral line, the scale units near the pectoral line are significantly larger than the scale units near the nipple point. The normalized scaling, however, allows statistical frequency of object occurrence as a function of breast position to be tabulated without regard to breast shape and size discrepancies. Several exemplary coordinates are shown on MLO view 1810.

For CC view 1820, the pectoral line is often not visible. The coordinate system for the CC view assumes that the pectoral line 1812 is perpendicular to the view edge, and therefore the nipple point 1816 is the point on skin line 1818 that is furthest from the image edge. The coordinate system also assumes that the pectoral line 1812 is located the same absolute distance from the nipple point as that measured in MLO view 1810. Assuming this x-axis definition, a similar x-axis-to-skin-line y-coordinate system as that used in the MLO view is adopted for the CC view. Several exemplary coordinates are shown on MLO view 1820.

Using the breast coordinate system described above, the x and y centroids of the cluster become the final cluster features input to the third classification stage 970.

Classification stage 970 accepts the nine cluster features from feature calculation 960. During a training phase, the same clustering process and cluster feature calculator are run on a training set containing a large number of radiographic images, with and without microcalcification clusters indicative of malignancy. Human-interactive classification, using one or more individuals with training in interpreting radiological images, indicates malignancy/non-malignancy for the clusters found in the training set. Using the training set objects, features, and human-input classification truthing, a cluster-feature probability density function (PDF) data set is calculated. The PDF data set is consulted to determine a malignancy probability for each cluster. Whether that probability results in a mark and display to a radiologist depends on the sensitivity set for the CAD process.

FIGS. 19a and 19b illustrate an example of a classifier 306 that may be used in an embodiment. Generally, the classifier estimates the probability that an evaluation point belongs to a particular class by first estimating the PDF value for each of two or more classes and then combining the different class PDF values into a probability. The combining of PDF values to estimate a probability can be performed using techniques such as the well-known Bayes' law. The classifier could also use the PDF estimates to generate likelihood ratios instead of probability values. In this embodiment, the classifier 306 includes one or more PDF units 1900 providing PDF estimates to a Probability unit 1901. Generally, the PDF units 1900 determine a PDF estimate for each possible classification for an object. For example, in an embodiment in which the classifier 306 is utilized to classify a microcalcification, there may be a PDF unit 1900 for each of a malignant microcalcification, a benign microcalcification, a lucent microcalcification, a vascular microcalcification, a film artifact, and anything else. Greater detail regarding the PDF unit 1900 is provided below.

Referring now to FIG. 19b, a PDF estimator 1900 that may be used by the classifier 306 (see FIG. 3) in accordance with an embodiment is shown, although different classifier probability units may be utilized. A neighborhood definition unit 1902 of the PDF estimator 1900 functionally defines neighborhood sizes for each representation point or bin of representation points. In some embodiments a variable neighborhood size may be desirable in order to allow for a functional description that better fits the actual measured feature data. In this embodiment, the neighborhood definition unit 1902 evaluates training data received, e.g., from a database, and determines the appropriate neighborhood sizes for the representation points included in the training data. The neighborhood definition unit 1902 provides vector $\vec{s}_P$, (a vector representing scale parameters for each representation point or bin of representation points for each feature or dimension) to a neighborhood determination unit 1904. In an embodiment, the neighborhood definition unit 1902 is performed off-line and the results, e.g., $\vec{s}_P$, are stored, such as being stored in a database, for later access. The vector $\vec{s}_P$ is utilized by the neighborhood determination unit 1904 to determine a scale parameter vector $\vec{\sigma}_S$—the size of the neighborhood to be used for the evaluation point $x_0$ for each dimension or feature.

The scale parameter vector $\vec{\sigma}_S$ is provided to a weight determination unit 1906 to determine weights $w_i$, which specifies how much weight to allocate to representation points of the training data. Once determined, the weights $w_i$ are provided to a local estimator 1908. The local estimator 1908 applies the weights $w_i$ to the training data to determine a PDF estimate for the point $x_0$, which may be stored, e.g., in a database. The following paragraphs provide greater detail.

PDF estimation for real-world multivariable systems with complex and/or sparse long-tailed distributions has historically been thwarted by several inherent difficulties. First, the well-studied, but highly-constrained, parametric models are often unable to accurately represent PDFs encountered in real-world applications. Second, if the models used are highly flexible or nonparametric, (for example, Parzen window based approaches) then the estimated values can be unreliable due to random sample variation. This is particularly true in the tail regions of a PDF where there are few samples. Methods to improve estimator reliability can result in intractable computation or memory requirements.

Embodiments described herein take a novel approach to PDF estimation. Instead of estimating and storing a complete PDF, a data set is stored that allows on-the-fly computation of a PDF estimator function for any specific local region in the PDF. The amount of data required to store an estimated PDF in this manner can be on the order of n×M, where n is the dimensionality of the system and M is a number of representation points, $r_i$. Each representation point represents one or more samples from the actual distribution that is being estimated. For instance, each sample in a sample set can receive its own representation point, with a unit weighting. Each sample can alternately be expressed through a representation point with a weight less than one. For instance, if two different multi-dimensional measurements are believed to originate from the same sample, each of the two samples can be given a representation point with a weight of 0.5. Finally, a representation point can "bin" several samples that are close in measurement space, by replacing the samples with a single representation point with a weight equal to the weights of the individual samples. The actual multidimensional sample value for a binned samples representation point can be the center of the bin, the mean of the binned samples, the median of the binned sample values in each dimension, etc.

In addition to the representation points, several other inputs are selected prior to performing estimation. One input is the evaluation point, $x_0$, at which the PDF is to be estimated. Another input is a vector $\vec{s}_P$, provided by the neighborhood definition unit 1902 in an embodiment, represents a set of scalar parameters that allow computation of a scale parameter vector, $\vec{\sigma}_S$. The scale parameter vector determines which of the representation points will be used in the estimation, and also can be a parameter for a function that determines the weight to be applied to each included point. Another input is the weighting function, $g(\vec{\sigma}_S)$, that will actually be applied to the representation points used in the estimation. The final input is a parameterized estimator function, $f(x_0, \theta)$, where $\theta$ is a parameter matrix for the function.

Figure 20:
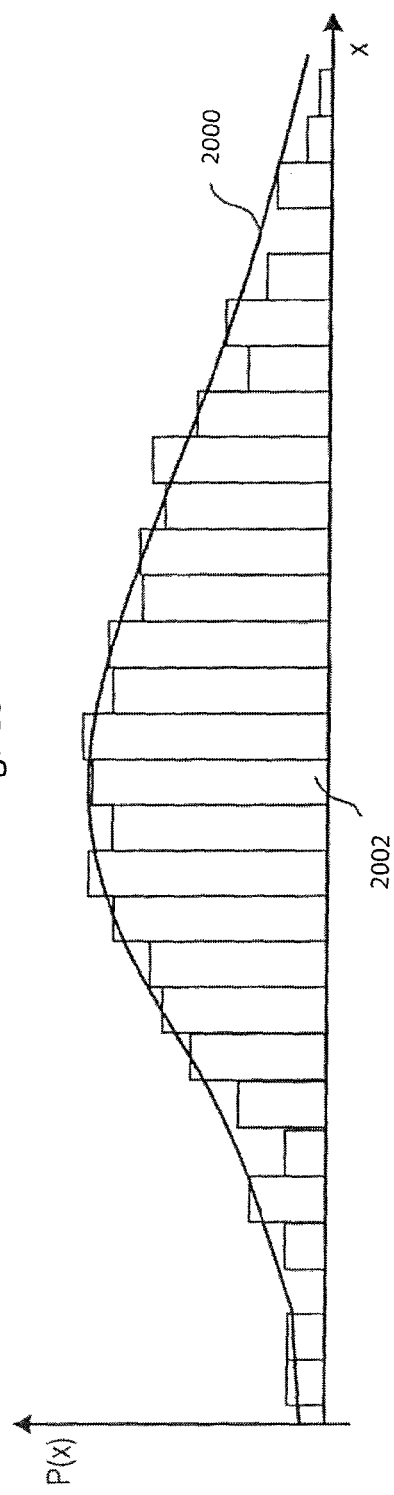
FIG. 20 illustrates a closed form PDF and a histogram of a sample distribution drawn from the probability distribution.

FIG. 20 shows a generic PDF 2000 for a one-dimensional random variable, superimposed on a histogram of a sample distribution drawn from the population of samples 2002 of the same random variable. With a large enough number of points, the histogram will tend towards a quantized version of the shape of PDF 2000, which may be estimated by a prior art technique such as a Parzen window. Towards the tails of PDF 2000, such an approach has difficulty producing a reliable estimate. The small number of samples often present in the tails means that in the tails, a simple windowed estimate either has high variance, due to the small number of samples, or fails to account for the true shape of the actual PDF, due to the application of a large linear window.

In preferred embodiments, the input data includes pre-calculated parameters from which an appropriate scale parameter can be calculated for any input evaluation point by, for example, the neighborhood determination unit 1904. Generally, the scale parameter will be larger towards the tails of the distribution, and smaller in more data-rich areas of the representation point space. Although a separate data structure can be used to store a description of the scale parameter over all sample space, in one embodiment each representation point stores parameters that can be used to calculate a scale parameter vector on the fly.

Figure 21:
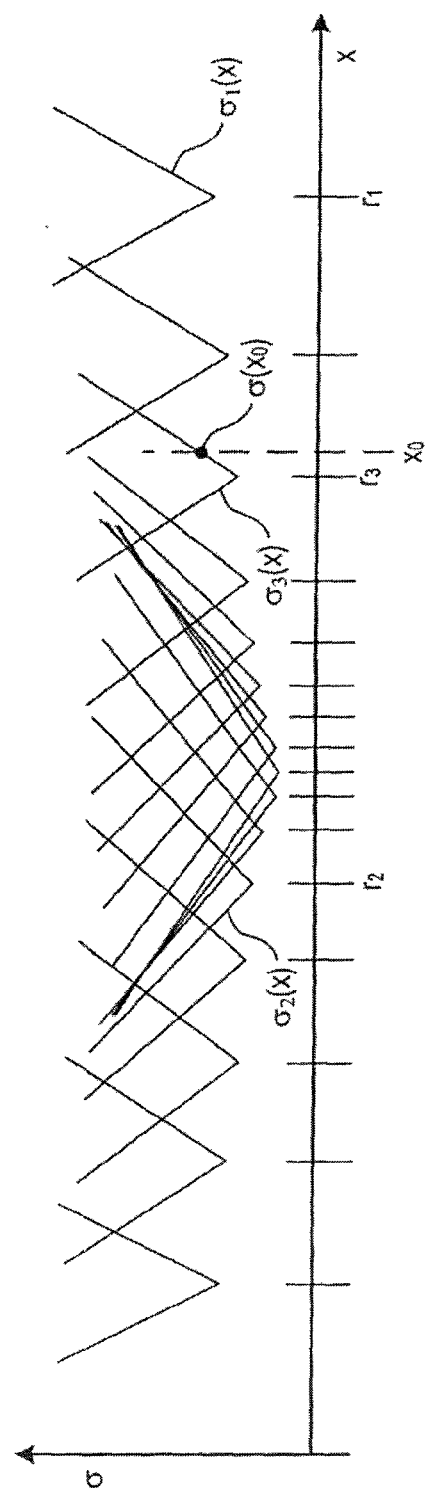
FIG. 21 shows, conceptually, estimation of a sigma value for a hypothetical one-dimensional distribution expressed by a set of representation points.

FIG. 21 illustrates one embodiment of representation-point scale parameter storage and usage, where each representation point $r_i$ also describes a minimum scale parameter value $\sigma_{MIN}(i)$ and a scale parameter slope $\sigma_{do}(i)$ for a scale parameter function $\sigma_i(x_0) = \sigma_{MIN}(i) + \sigma_{do}(i)|x_0 - r_i|$. Thus for any evaluation point $x_0$, the scale parameter function allows calculation of a scale parameter. The scale parameter for use with an evaluation point can thus be defined as the minimum scale parameter function value $\sigma_i(x_0)$, evaluated for all i, which minimum values $\vec{\sigma}_S$ are provided to the weight determination unit 1906. In practical applications, the scale parameter may need only be evaluated for representation points close to the evaluation point. This can be seen by an inspection of FIG. 22, where scale parameter functions $\sigma_i(x)$ are plotted for each evaluation point ($\sigma_1(x)$, for $r_1$, $\sigma_2(x)$, for $r_2$, $\sigma_3(x)$, for $r_3$, are labeled). The value $\sigma_3(x_0)$ is lower than the scale parameter function values associated with all other representation points, and is thus selected as the scale parameter for evaluation point $x_0$. Alternatively, the different scale parameter function values could be combined with mathematical functions other than "min" (for example, the mean or a particular percentile of the different values could be used).

With multiple dimensions, a different scale parameter will typically be found for each dimension, depending on the local sparseness of representation points around $x_0$ in that dimension.

Figure 22:
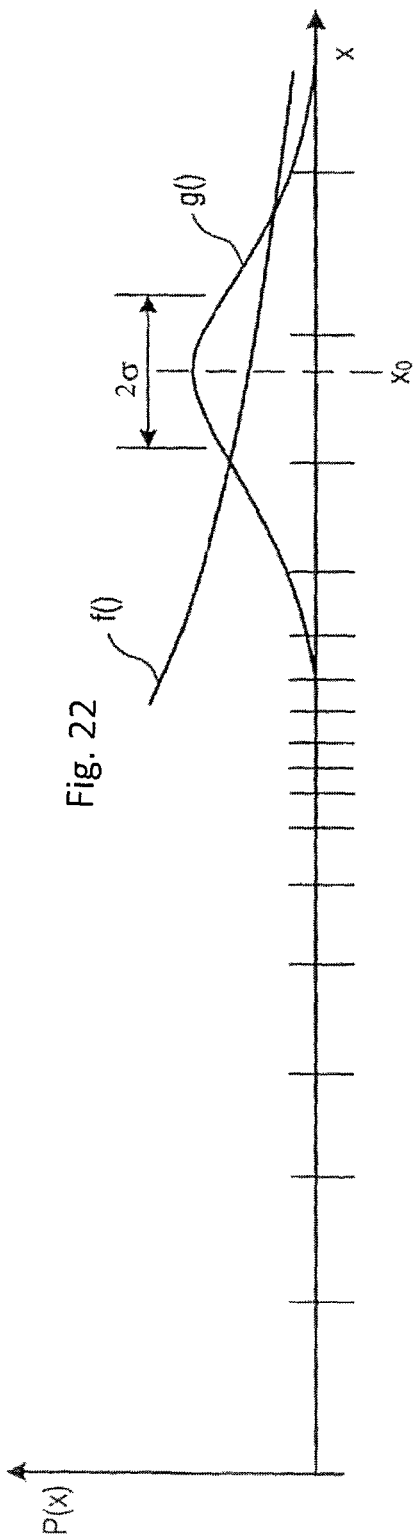
FIG. 22 shows application of the FIG. 21 sigma value to estimation of the PDF at the evaluation point.

Once the scale parameter for each dimension is found, the scale parameter can next be used to limit the representation points that will be used to estimate the PDF at the evaluation point. For instance, a practical rule of thumb based on distance from the evaluation point, such as a multiple of the scale factor, can be used to exclude representation points that practically cannot affect the calculation as illustrated in FIG. 22, thus saving computation time. Alternately, all representation points can be evaluated, no matter how far they lie from the evaluation point.

The scale parameter is also employed to calculate an overall weight for each representation point using the defined weighting function $w_i = g(r_i; x_0, \sigma(x_0))$, as illustrated by the weight determination unit 1906 (FIG. 19).

The selected, weighted representation points are used to calculate a parameter matrix, $\theta$, for the parameterized estimator function $f(x,\theta)$ calculated by the local estimator 1908. In an embodiment, the parameter matrix is calculated to maximize the function:

$$\sum_i [w_i \cdot h(f(r_i, \theta))],$$

where h( ) is a monotonic function.

For some function selections, when the modeled PDF is nonzero for all points in n-dimensional space, equations can be used to solve for the parameter matrix. In one such embodiment, the weight function g( ) is a Gaussian function, h( ) is a log function, and $f( )$ is a second-order exponential function: $f(x,\theta) = C \cdot e^{\theta_1 x^2 + \theta_2 x}$, where $$C = \frac{1}{N} \frac{\sum_i g(r_i; x_0, \sigma(x_0))}{\int_x g(x; x_0, \sigma(x_0)) e^{\theta_1 x^2 + \theta_2 x}}$$

and N is the number of representation points.

In a multidimensional solution, the above equations are still applied, with the understanding that the variables and parameters are multidimensional.

The general approach described above can also be applied where the PDF has a zero value in some parts of n-dimensional space. The approach can also be applied where h, g, or $f$ are not in a directly solvable form. In such cases, the parameter matrix can be approximated using numerical methods, such as Newton-Rhapson optimization.

Once the parameter matrix for the estimator function has been found, it is now possible to evaluate the estimator function at the evaluation point to obtain a PDF value.

A wide variety of applications exist for PDF techniques according to an embodiment. Some disciplines that can benefit from accurate PDF estimation include pattern recognition, classification, estimation, computer vision, image processing, and signal processing. The compact space requirements of the PDF estimation data add practicality for PDF data set compact storage, update distribution, the inclusion of additional discriminant variables and/or classes, etc.

Although several embodiments and alternative implementations have been described, many other modifications and implementation techniques will be apparent to those skilled in the art upon reading this disclosure. In a given embodiment, the equation used to solve for the estimator function parameters can be defined such that its minimization selects the parameter matrix. The scale parameter for a given evaluation point can be calculated at runtime from the representation points directly, although good solutions for the scale parameter may be more costly to calculate without precalculation of per-representation point functions.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 23:
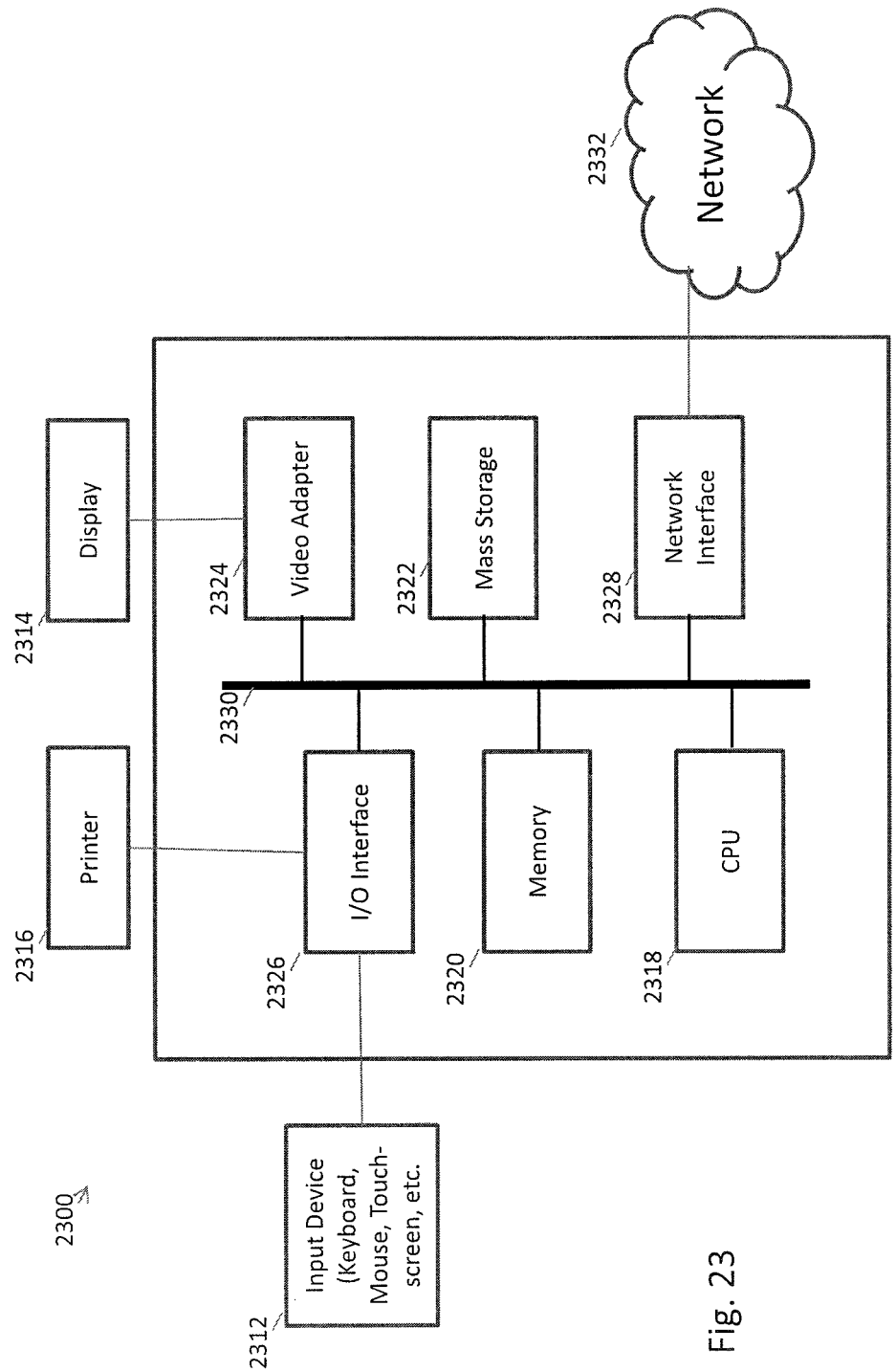
FIG. 23 is a block diagram of a desktop computing device in accordance with an embodiment.

For example, FIG. 23 is a block diagram of a computing system 2300 that may also be used in accordance with an embodiment. It should be noted, however, that the computing system 2300 discussed herein is provided for illustrative purposes only and that other devices may be used. The computing system 2300 may comprise, for example, a desktop computer, a workstation, a laptop computer, a personal digital assistant, a dedicated unit customized for a particular application, or the like. Accordingly, the components of the computing system 2300 disclosed herein are for illustrative purposes only and other embodiments of the present invention may include additional or fewer components.

In an embodiment, the computing system 2300 comprises a processing unit 2310 equipped with one or more input devices 2312 (e.g., a mouse, a keyboard, or the like), and one or more output devices, such as a display 2314, a printer 2316, or the like. Preferably, the processing unit 2310 includes a central processing unit (CPU) 2318, memory 2320, a mass storage device 2322, a video adapter 2324, an I/O interface 2326, and a network interface 2328 connected to a bus 2330. The bus 2330 may be one or more of any type of several bus architectures including a memory bus or memory controller, a peripheral bus, video bus, or the like. The CPU 2318 may comprise any type of electronic data processor. For example, the CPU 2318 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 2320 may comprise any type of system memory such as static random access memory (SRAM), dynamic random access memory (DRAM), synchronous DRAM (SDRAM), read-only memory (ROM), a combination thereof, or the like. In an embodiment, the memory 2320 may include ROM for use at boot-up, and DRAM for data storage for use while executing programs. The memory 2320 may include one of more non-transitory memories.

The mass storage device 2322 may comprise any type of storage device configured to store data, programs, and other information and to make the data, programs, and other information accessible via the bus 2328. In an embodiment, the mass storage device 2322 is configured to store the program to be executed by the CPU 2318. The mass storage device 2322 may comprise, for example, one or more of a hard disk drive, a magnetic disk drive, an optical disk drive, or the like. The mass storage device 2322 may include one or more non-transitory memories.

The video adapter 2324 and the I/O interface 2326 provide interfaces to couple external input and output devices to the processing unit 2310. As illustrated in FIG. 14, examples of input and output devices include the display 2314 coupled to the video adapter 2324 and the mouse/keyboard 2312 and the printer 2316 coupled to the I/O interface 2326. Other devices may be coupled to the processing unit 2310.

The network interface 2328, which may be a wired link and/or a wireless link, allows the processing unit 2310 to communicate with remote units via the network 2332. In an embodiment, the processing unit 2310 is coupled to a local-area network or a wide-area network to provide communications to remote devices, such as other processing units, the Internet, remote storage facilities, or the like It should be noted that the computing system 2300 may include other components. For example, the computing system 2300 may include power supplies, cables, a motherboard, removable storage media, cases, a network interface, and the like. These other components, although not shown, are considered part of the computing system 2300. Furthermore, it should be noted that any one of the components of the computing system 2300 may include multiple components. For example, the CPU 2318 may comprise multiple processors, the display 2314 may comprise multiple displays, and/or the like. As another example, the computing system 2300 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. Various parameters and thresholds exist and can be varied for a given implementation with given data characteristics, with experimentation and ultimate performance versus computation time tradeoffs necessary to arrive at a desired operating point. Implementation methods such as sorting, trees, hashing, and other data manipulation methods can be applied as desired to achieve a desired performance. Although at least one specific method has been described for calculation of each feature type, many alternate methods and feature definitions exist for calculating similar features with similar or acceptable performance. Preferred embodiments use a PDF-classification implementation with the feature sets. It is believed that the disclosed feature sets can also be advantageous in CAD systems not using a PDF-classification approach. Likewise, the breast coordinate system described herein, or variants thereof, are believed to have applicability in other CAD approaches.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for detecting an anomaly in an image, the method comprising:
   convolving, by a processor, a digital image with a smoothing filter to create a plurality of first convolved images at differing scales;
   convolving, by the processor, each of the plurality of first convolved images with a second derivative filter, thereby creating a plurality of second convolved images, each of the plurality of first convolved images and a corresponding one of the plurality of second convolved images corresponding to respective ones of a plurality of stages;
   creating, by the processor, a plurality of surgery masks, each surgery mask based at least in part on one of the plurality of the second convolved images of a current stage and one of the plurality of second convolved images from a previous stage;
   determining, by the processor, a neighborhood median for each pixel location of the plurality of surgery masks;
   identifying, by the processor, one or more peaks in the digital image based at least in part upon the second convolved image from the current stage, the first convolved image from the previous stage, and the neighborhood medians for the current stage; and
   storing, by the processor in a non-transitory computer-readable memory, a peak list comprising selected one or more of the one or more peaks having a corresponding contrast ratio higher than a contrast ratio threshold.

2. The method of claim 1, wherein the creating the plurality of surgery masks based at least in part on one of the plurality of second convolved images from the previous stage is performed at least in part by using the neighborhood median from the previous stage.

3. The method of claim 2, wherein the creating the plurality of surgery masks based at least in part on one of the plurality of second convolved images from the previous stage is performed at least in part by comparing, for each pixel of respective ones of the plurality of second convolved images, a pixel relative contrast to a threshold.

4. The method of claim 3, wherein the pixel relative contrast is determined at least in part by dividing a pixel value of the respective second convolved images of the current stage by a neighborhood median of a same pixel location of a previous stage.

5. The method of claim 1, further comprising excluding a peak detected at a smaller scale from a larger scale.

6. The method of claim 1, wherein the digital image is a scaled image.

7. The method of claim 1, wherein a standard deviation doubles from one scale to a next scale.

8. A system for identifying anomalies in a digitized image, the system comprising:
  a processor; and
  a non-transitory computer readable storage medium storing programming for execution by the processor, the programming including instructions for:
    convolving a digitized image with a smoothing filter, creating a first convolved image;
    convolving the first convolved image with a second derivative filter, creating a second convolved image;
    determining a neighborhood median for each pixel in the second convolved image;
    identifying pixels in the digitized image having peak values, in accordance with the digitized image, the second convolved image, and the neighborhood median for each pixel in the second convolved image; and
    storing a peak list comprising selected one or more of the identified pixels having a corresponding contrast ratio higher than a contrast ratio threshold.

9. The system of claim 8, wherein the digitized image is a prior convolved image from a previous stage.

10. The system of claim 8, wherein the programming further includes instructions for removing pixels having a pixel relative contrast greater than a relative contrast threshold from the second convolved image, and wherein the instructions to determine the neighborhood median for each pixel include further instructions for using at least in part the second convolved image after execution of the instructions to remove the pixels.

11. The system of claim 10, wherein the pixel relative contrast is determined at least in part by dividing a pixel value of the respective second convolved image of a current stage by a neighborhood median of a same pixel location based at least in part upon a previous stage second convolved image.

12. The system of claim 10, wherein the relative contrast threshold is a multiple of a global median absolute deviation.

13. The system of claim 8, wherein the programming further includes instructions for comparing each corresponding contrast ratio of each identified pixel with the contrast ratio threshold.

14. The system of claim 8, wherein the smoothing filter comprises a Gaussian kernel, and wherein the second derivative filter comprises a Laplacian function.

15. A computer program product for identifying anomalies, the computer program product having a non-transitory computer-readable medium with a computer program embodied thereon, the computer program comprising:
  computer program code for convolving a digitized image with a smoothing filter, thereby creating a plurality of first convolved images, each of the convolved images corresponding to a different scale;
  computer program code for convolving each of the plurality of first convolved images with a second derivative filter, creating a plurality of second convolved images;
  computer program code for determining a neighborhood median for each pixel of each of the plurality of second convolved images;
  computer program code for identifying peak regions based at least in part upon one of the plurality of first convolved images and one of the second convolved images, the one of the second convolved images corresponding to the one of the plurality of first convolved images after being convolved by the convolving a digitized image and the convolving each of the plurality of first convolved images; and
  computer program code for storing a peak list comprising selected one or more of the peak regions having a corresponding contrast ratio higher than a contrast ratio threshold.

16. The computer program product of claim 15, wherein the plurality of first convolved images represent Gaussian-blurred images.

17. The computer program product of claim 15, wherein the plurality of second convolved images represent Laplacian curvature images.

18. The computer program product of claim 15, wherein the computer program code for determining the neighborhood median includes computer program code for excluding peak regions identified in a previous scale.

19. The computer program product of claim 15, further comprising computer program code for excluding pixels from the plurality of second convolved images used for determining the neighborhood median.

20. The computer program product of claim 19, wherein the computer program code for excluding pixels includes computer program code for comparing a pixel relative contrast to the neighborhood median.

* * * * *